(12) United States Patent
Tsujino et al.

(10) Patent No.: US 7,911,492 B2
(45) Date of Patent: Mar. 22, 2011

(54) LINE HEAD AND IMAGE FORMING APPARATUS INCORPORATING THE SAME

(75) Inventors: Kiyoshi Tsujino, Nagano (JP); Yujiro Nomura, Nagano (JP); Ken Ikuma, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 50 days.

(21) Appl. No.: 12/351,324

(22) Filed: Jan. 9, 2009

(65) Prior Publication Data

US 2009/0122129 A1    May 14, 2009

Related U.S. Application Data

(62) Division of application No. 11/134,038, filed on May 20, 2005, now abandoned.

(30) Foreign Application Priority Data

May 20, 2004 (JP) ............................... P2004-150402
May 20, 2004 (JP) ............................... P2004-150403
May 20, 2004 (JP) ............................... P2004-150404

(51) Int. Cl.
*B41J 2/435* (2006.01)
(52) U.S. Cl. ........................................ 347/236; 347/246
(58) Field of Classification Search .................. 347/236, 347/237, 246, 247
See application file for complete search history.

(56) References Cited

U.S. PATENT DOCUMENTS

| | | | |
|---|---|---|---|
| 4,982,203 A * | 1/1991 | Uebbing et al. ............... 347/236 |
| 5,099,192 A | 3/1992 | Thayer et al. | |
| 5,225,850 A | 7/1993 | Egawa et al. ................. 347/246 |
| 5,237,339 A | 8/1993 | Ichikawa ....................... 347/130 |
| 5,668,587 A * | 9/1997 | Hammond et al. ............ 347/237 |
| 5,959,655 A * | 9/1999 | Maruo et al. .................. 347/246 |
| 5,963,242 A | 10/1999 | Nakayama et al. | |
| 6,104,509 A | 8/2000 | Yoshida | |
| 6,504,565 B1 * | 1/2003 | Narita et al. ................... 347/237 |
| 6,633,322 B2 | 10/2003 | Sakai et al. .................... 347/233 |
| 6,686,946 B2 | 2/2004 | Masuda et al. | |
| 6,747,617 B1 | 6/2004 | Kawashima .................... 345/76 |
| 6,828,538 B2 | 12/2004 | Maeda .......................... 250/205 |
| 6,989,849 B2 | 1/2006 | Nomura et al. ............... 347/133 |
| 7,148,629 B2 | 12/2006 | Ha et al. ..................... 315/169.3 |

(Continued)

FOREIGN PATENT DOCUMENTS

EP    0480650 A1    4/1992

(Continued)

OTHER PUBLICATIONS

European partial Search Report for corresponding European application 05011030.3-2304 lists the references above.

*Primary Examiner* — Hai C Pham
(74) *Attorney, Agent, or Firm* — DLA Piper LLP (US)

(57) ABSTRACT

At least one light emission array includes a plurality of light emitting elements arrayed in a first direction. Each of the light emitting elements is an organic electroluminescence element. A monitor quantitatively monitors a light emitting state of at least one of the light emitting elements to obtain a monitored amount. A comparator compares the monitored amount and a reference amount. A controller performs a constant current control with respect to at least one of the light emitting elements in accordance with a result of the comparison performed by the comparator.

12 Claims, 16 Drawing Sheets

U.S. PATENT DOCUMENTS

| | | |
|---|---|---|
| 7,199,769 B2 | 4/2007 | Hyuga ............................. 345/77 |
| 7,298,350 B2 | 11/2007 | Kitazawa et al. |
| 2002/0051052 A1 | 5/2002 | Masuda et al. |
| 2002/0071132 A1 | 6/2002 | Yamada et al. |
| 2002/0122308 A1 | 9/2002 | Ikeda ............................ 362/259 |
| 2003/0090481 A1 | 5/2003 | Kimura |
| 2004/0174426 A1 | 9/2004 | Nomura et al. |
| 2005/0174419 A1 | 8/2005 | Kitazawa et al. |
| 2005/0263718 A1 | 12/2005 | Tsujino et al. ............. 250/483.1 |
| 2007/0210720 A1 | 9/2007 | Kimura |

FOREIGN PATENT DOCUMENTS

| | | |
|---|---|---|
| EP | 1324156 A1 | 7/2003 |
| JP | 04128063 A | 4/1992 |
| JP | 04363265 A | 12/1992 |
| JP | 05092615 A | 4/1993 |
| JP | 09069650 A | 3/1997 |
| JP | 09193450 A | 7/1997 |
| JP | 09199760 A | 7/1997 |
| JP | 10181093 A | 7/1998 |
| JP | 11-138899 | 5/1999 |
| JP | 2000238333 A | 9/2000 |
| JP | 2002079710 A | 3/2002 |
| JP | 2003216110 A | 7/2003 |
| JP | 2004042518 A | 2/2004 |
| JP | 2004098317 A | 4/2004 |
| JP | 2004114508 A | 4/2004 |

* cited by examiner

LINE HEAD AND IMAGE FORMING APPARATUS INCORPORATING THE SAME

CROSS-REFERENCE TO THE RELATED APPLICATIONS

This application is a divisional of application Ser. No. 11/134,038 filed May 20, 2005, the entire contents of which are incorporated herein by reference. This application also claims the benefit of priority under 35 USC 119 to Japanese Patent Application No. 2004-150402 filed May 20, 2004, Japanese Patent Application No. 2004-150403 filed May 20, 2004 and Japanese Patent Application No. 2004-150404 filed May 20, 2004, the entire contents of all of which are incorporated herein by reference.

BACKGROUND OF THE INVENTION

The present invention relates to a line head using organic EL (electroluminescence) elements and an image forming apparatus incorporating such a line head.

There has been developed image forming apparatus in which a line head having a large number of arrayed light emitting devices is used as an exposure unit. Japanese Patent Publication No. 11-138899A discloses an image forming apparatus in which a light emitting device array made of a plurality of light emitting devices is integrated in a single chip so as to form an exposure unit. In this example, single-chip light emitting device arrays for respective colors are once formed on a single substrate and then separated. The single-chip light emitting device arrays are disposed in corresponding color developing units respectively. Thus, the variation in light emitting characteristic is canceled.

In addition to light emission diodes (LEDs), organic EL elements have been proposed as light emitting devices applicable to such a line head. There is an advantage that the organic EL elements can be controlled statically so that a control system therefor can be simplified. In a line head using a plurality of light emitting devices made of organic EL elements, the light emitting devices may be driven by constant current control or constant voltage control in order to keep the quantities of light emission from the light emitting devices constant.

In a case where the light emitting devices are often driven by constant voltage control with a comparatively simple circuit configuration, the operating time period may exceed a predetermined time period when light emitting devices made of organic EL elements are driven by constant voltage control. In such a case, it has been known that the emitted light amount from each light emitting device is lowered due to a change in resistance value of the light emitting device caused by the intrinsic characteristic proper to the organic EL element.

Assume that a constant voltage Va is applied to each light emitting device as shown in FIG. 17A. In this case, the emitted light amount has a constant value Ia till the operating time period reaches a predetermined time period or 200 hours in this example, as shown in FIG. 17B. When the operating time period exceeds 200 hours, the emitted light amount begins to decrease from the value Ia to a value Ix. When the operating time period exceeds 250 hours, the emitted light amount further decreases to a value Iy.

Japanese Patent Publication No. 11-138899A also teaches the use of organic EL elements as light emitting devices. However, there is no suggestion about a solution to the lowering of the emitted light amount when the operating time period exceeds a predetermined value as shown in FIGS. 17A and 17B in the case where organic EL elements are controlled by constant voltage control. Therefore, when organic EL elements attached to a line head are driven by constant voltage control, there is a problem that the technique cannot deal with deterioration in image quality caused by the lowering of the emitted light amount when the operating time period exceeds the predetermined value.

SUMMARY OF THE INVENTION

It is therefore an object of the invention to provide a line head using EL elements and an image forming apparatus in which there is no deterioration in image quality even when the operating time period exceeds a predetermined time period.

In order to achieve the above object, according to the invention, there is provided a line head, comprising:

at least one light emission array including a plurality of light emitting elements arrayed in a first direction, each of which is an organic electroluminescence element;

a monitor, which quantitatively monitors a light emitting state of at least one of the light emitting elements to obtain a monitored amount;

a comparator, which compares the monitored amount and a reference amount; and a controller, which performs a constant current control with respect to at least one of the light emitting elements in accordance with a result of the comparison performed by the comparator.

With the above configuration, the intrinsic characteristic proper to the organic EL elements causing the lowering of the emitted light amount when the operating time period exceeds a predetermined time period is compensated so that the image quality can be prevented from deteriorating.

Preferably, the monitor monitors a drive voltage of the at least one of the light emitting elements. Here, the reference amount is a value of the drive voltage.

Preferably, the constant current control is performed in a feed back control manner.

Preferably, the monitor monitors an emitted light amount of the at least one of the light emitting elements.

Preferably, the constant current control is performed with respect to each of the light emitting elements.

Preferably, the light emitting elements are divided into a plurality of groups, and the constant current control is performed with respect to each of the groups.

Preferably, the constant current control is simultaneously performed with respect to the respective light emitting elements.

Preferably, the constant current control is performed by increasing a drive current for the at least one of the light emitting elements, every time when the result of the comparison indicates that an emitted light amount of the at least one of the light emitting elements becomes lower than a threshold value.

Preferably, a plurality of light emission arrays are arranged in a second direction which is perpendicular to the first direction.

According to the invention, there is also provided an image forming apparatus, comprising:

an image carrier, having a photoconductive surface;

the above line head, which emits light to form an electrostatic latent image on the photoconductive surface; and a developing device, which supplies developer onto the photoconductive surface to make the electrostatic latent image visible.

According to the invention, there is also provided a line head, comprising:

at least one light emission array including a plurality of light emitting elements arrayed in a first direction, each of which is an organic electroluminescence element;

a counter, which counts an amount indicative of a used state of at least one of the light emitting elements; and a controller, which performs a constant voltage control with respect to at least one of the light emitting elements in accordance with the amount counted by the counter.

With this configuration, the lowering of the emitted light amount from the line head caused by aged deterioration of the organic EL element is compensated so that the image quality can be prevented from deteriorating.

Preferably, the counter counts a cumulative operating time period of the at least one of the light emitting elements.

Preferably, the counter counts the number of a recording medium on which an image formed by the line head is recorded.

Preferably, the counter counts the number of formation of a dot array having a predetermined pattern.

Preferably, the constant current control is performed with respect to each of the light emitting elements.

Preferably, the light emitting elements are divided into a plurality of groups, and the constant current control is performed with respect to each of the groups.

Preferably, the constant current control is simultaneously performed with respect to the respective light emitting elements by applying same voltage.

Preferably, each of the light emitting elements is driven by a field effect transistor, and a condenser is connected between a gate electrode and a drain electrode of the field effect transistor.

Preferably, the constant current control is performed by increasing a drive voltage for the at least one of the light emitting elements, every time when the result of the comparison indicates that an emitted light amount of the at least one of the light emitting elements becomes lower than a threshold value.

Preferably, a plurality of light emission arrays are arranged in a second direction which is perpendicular to the first direction.

According to the invention, there is also provided an image forming apparatus, comprising:

an image carrier, having a photoconductive surface;

the above line head, which emits light to form an electrostatic latent image on the photoconductive surface; and a developing device, which supplies developer onto the photoconductive surface to make the electrostatic latent image visible.

According to the invention, there is also provided a line head, comprising:

at least one light emission array including a plurality of light emitting elements arrayed in a first direction, each of which is an organic electroluminescence element;

a monitor, which quantitatively monitors a light emitting state of at least one of the light emitting elements to obtain a monitored amount; and a controller, which performs a constant voltage control with respect to at least one of the light emitting elements in accordance with the monitored amount.

With this configuration, the lowering of the emitted light amount from the light emitting devices caused by aged deterioration of the organic EL element is compensated so that the image quality can be prevented from deteriorating.

Preferably, the monitor monitors a drive current of the at least one of the light emitting elements.

Preferably, the monitored amount is input to the controller in a feed back control manner.

Preferably, the monitor monitors an emitted light amount of the at least one of the light emitting elements.

Preferably, the constant current control is performed with respect to each of the light emitting elements.

Preferably, the light emitting elements are divided into a plurality of groups, and the constant current control is performed with respect to each of the groups.

Preferably, the constant current control is simultaneously performed with respect to the respective light emitting elements by applying same voltage.

Preferably, each of the light emitting elements is driven by a field effect transistor, and a condenser is connected between a gate electrode and a drain electrode of the field effect transistor.

Preferably, the constant current control is performed by increasing a drive voltage for the at least one of the light emitting elements, every time when the result of the comparison indicates that an emitted light amount of the at least one of the light emitting elements becomes lower than a threshold value.

Preferably, a plurality of light emission arrays are arranged in a second direction which is perpendicular to the first direction.

According to the invention, there is also provided an image forming apparatus, comprising:

an image carrier, having a photoconductive surface;

the above line head, which emits light to form an electrostatic latent image on the photoconductive surface; and a developing device, which supplies developer onto the photoconductive surface to make the electrostatic latent image visible.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Embodiments of the invention will be described below in detail with reference to the accompanying drawings.

Figure 1A:
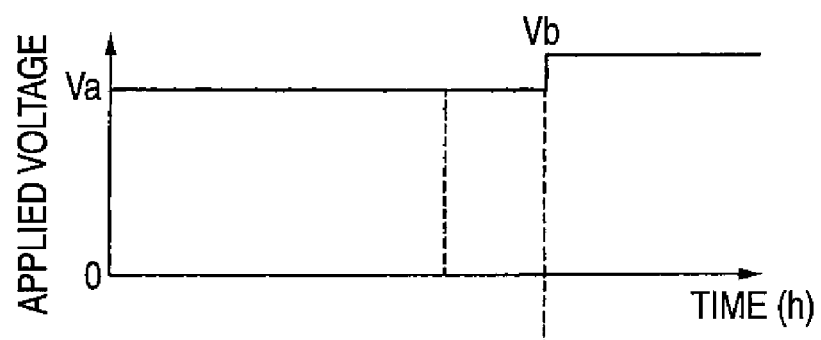
FIG. 1A is a diagram showing the relationship between the operating time period of each light emitting element in a line head according to a first embodiment of the invention and the voltage value applied to the light emitting element.
Figure 1B:
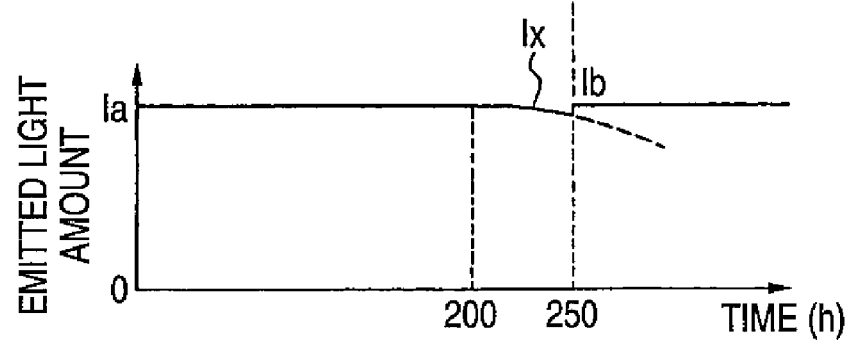
FIG. 1B is a diagram showing the relationship between the operating time period of the light emitting element of FIG. 1A and the emitted light amount therefrom.

FIGS. 1A and 1B show an operation principle of a line head according to a first embodiment of the invention. In this embodiment, constant voltage control is performed on light emitting elements with a voltage whose value is increased as soon as the operating time period of each light emitting element exceeds a predetermined time period, for example, 250 hours. The lowered emitted light amount is increased by such a constant voltage control to be restored to its initial emitted light amount.

FIG. 1A shows the relationship between the operating time period of each light emitting element and the voltage value applied to the light emitting element. In this example, a constant voltage Va is initially applied to the light emitting element so as to perform constant voltage control thereon. As soon as the operating time period of the light emitting element exceeds 250 hours, the driving voltage is increased from the value Va to a value Vb, with which constant voltage control is performed on the light emitting element. That is, constant voltage control is performed on the light emitting element with an applied voltage being changed in accordance with the operating time period. In such a manner, the voltage control performed on each light emitting element according to the embodiment of the invention is a constant voltage control with an applied voltage whose value is changed stepwise in accordance with the operating time period of the light emitting element. Accordingly, deterioration in image quality can be prevented in a simple way.

FIG. 1B shows the relationship between the operating time period of each light emitting element and the emitted light amount therefrom. The emitted light amount from the light emitting element decreases from an initial value Ia to a value Ix when the operating time period exceeds 200 hours. Assume that the operating time period further increases, and the operating time period of the light emitting element exceeds 250 hours. In this case, the applied voltage is increased from the value Va to the value Vb as described above. Accordingly, as for the emitted light amount, the characteristic in which the emitted light amount has decreased from the value Ia to the value Ix is improved to the characteristic in which the emitted light amount reaches a value Ib substantially close to the initial value Ia.

Figure 2:
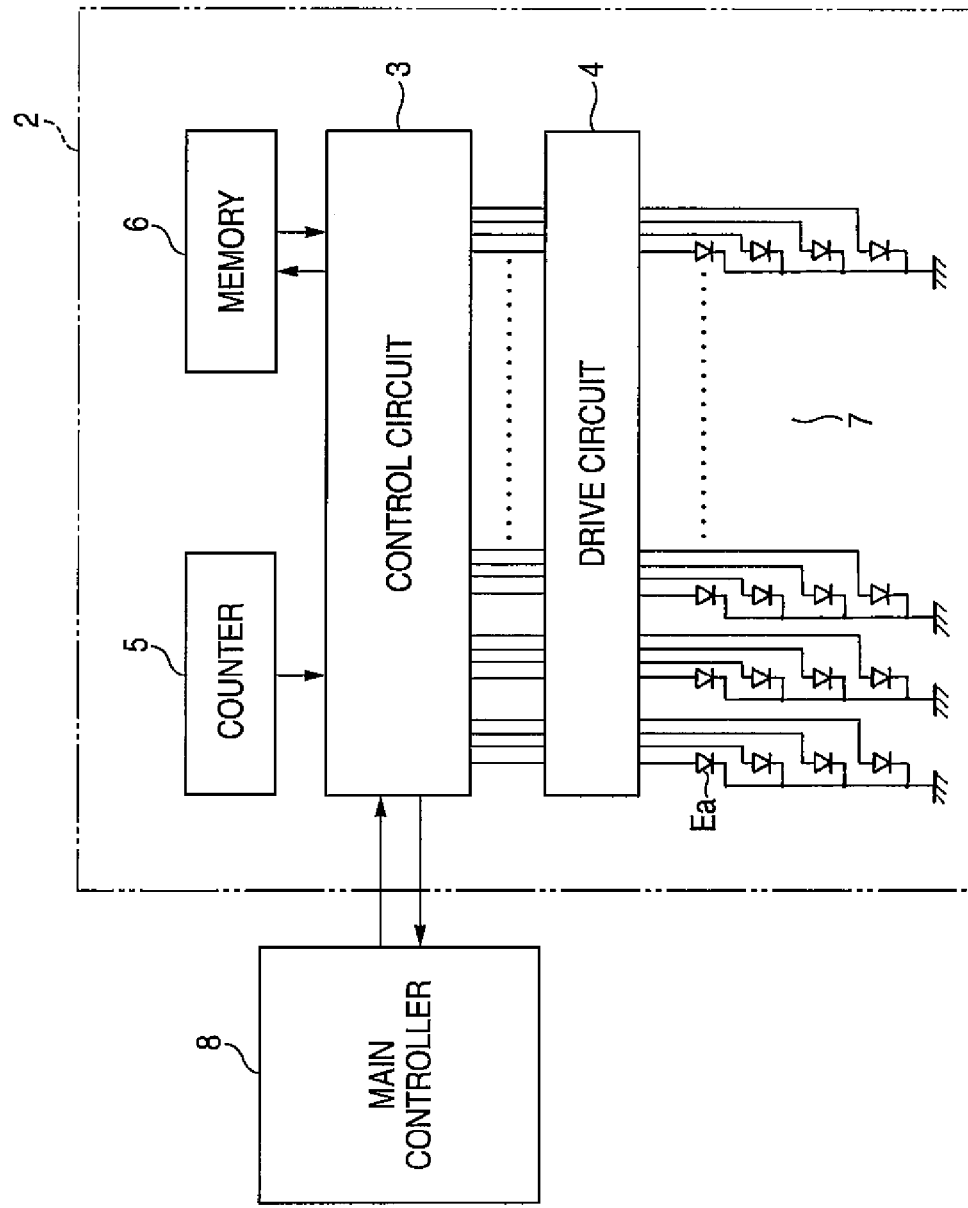
FIG. 2 is a block diagram showing the schematic configuration of a control section of the line head of FIG. 1A.

FIG. 2 is a block diagram showing the schematic configuration of a control section of a line head. Light emitting element arrays 7 are arranged in a secondary scanning direction so that each array extending in a primary scanning direction has a plurality of light emitting elements Ea. A counter 5 obtains a count value as to the use state of the line head. For example, the counter 5 may be a counter for counting a cumulative operating time period of each light emitting element, a counter for counting the number of sheets of recording paper served for printing, a dot counter, or the like. The count value obtained by such a counter is put into a control circuit 3.

A main controller 8 generates print data and transmits the print data to the control section 2 of the line head. A memory 6 stores a characteristic of each light emitting element Ea, for example, a relationship between an operating time period and an emitted light amount as shown in FIG. 1B. The main controller 8 generates a relationship between the operating time period and a voltage to be applied as shown in FIG. 1A, and transmits the generated relationship to the control circuit 3. The control circuit 3 stores the received relationship in the memory 6. The control circuit 3 performs constant voltage control upon each light emitting element while referring the relationship between the operating time period and the emitted light amount and the count value (operation state of the light emitting element) supplied from the counter 5. When the counter 5 counts the cumulative operating time period of each light emitting element, the control circuit 3 determines whether the operating time period of the light emitting element exceeds 250 hours or not When the operating time period of the light emitting element exceeds 250 hours, constant voltage control is performed with the applied voltage being increased from the value Va to the value Vb.

In such a manner, voltage control is performed upon the light emitting elements individually by the control circuit 3 based on the light emission state of each light emitting element estimated from the relationship shown in FIG. 1B. Thus, a high quality image can be formed even when the operating time period of each light emitting element exceeds a predetermined time period.

In the embodiment, a drive circuit 4 constituted by thin film transistors (TFT) applies voltages to the individual light emitting elements Ea respectively so as to perform constant voltage control. However, one and the same voltage may be applied to all the light emitting elements forming the same array extending in the primary scanning direction. With such a configuration, constant voltage control can be performed upon a plurality of light emitting elements more simply.

In the embodiment, a plurality of light emitting element arrays are provided in the secondary scanning direction of a line head. Accordingly, the line head can perform the multiple exposure. In addition, an image can be formed by one array extending in the primary scanning direction while the other arrays serve as spares for failure of the image forming line. In such a manner, the image forming apparatus can be applied to various applications due to the plurality of light emitting element arrays provided in the secondary scanning direction of the line head.

Figure 3:
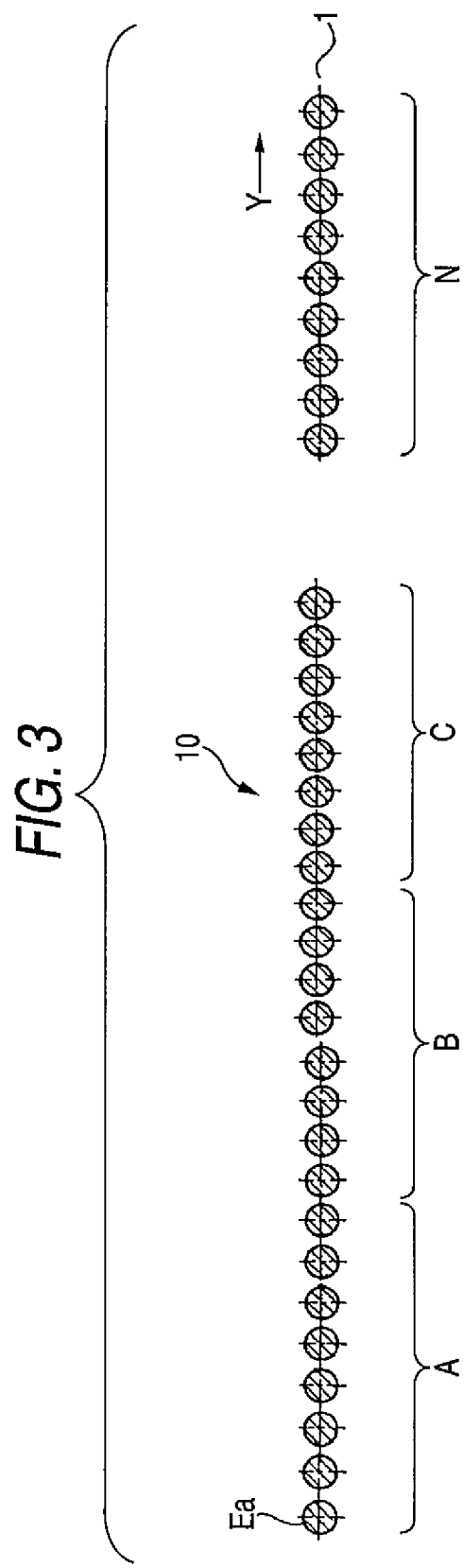
FIG. 3 is an explanatory view of a modified example of the line head of FIG. 1A.

The line head according to the invention is not limited to the embodiment in which a plurality of light emitting element arrays are provided in the secondary scanning direction as shown in FIG. 2. As shown in FIG. 3, one light emitting element array 1 is provided in a line head 10. A plurality of light emitting elements Ea comprised of organic EL elements are arrayed in the light emitting element array 1 in a primary scanning direction (Y-direction).

The light emitting element array 1 is divided into a plurality of blocks A, B, C, . . . and N. In this case, constant voltage control as shown in FIG. 1A can be performed not only by the element basis (dot basis) as described the above, but also by the block basis. In the case where constant voltage control is performed thus by the block basis, deterioration in image quality can be prevented when various image patterns are formed. How to perform this block-basis constant voltage control will be described with reference to FIG. 4.

Figure 4:
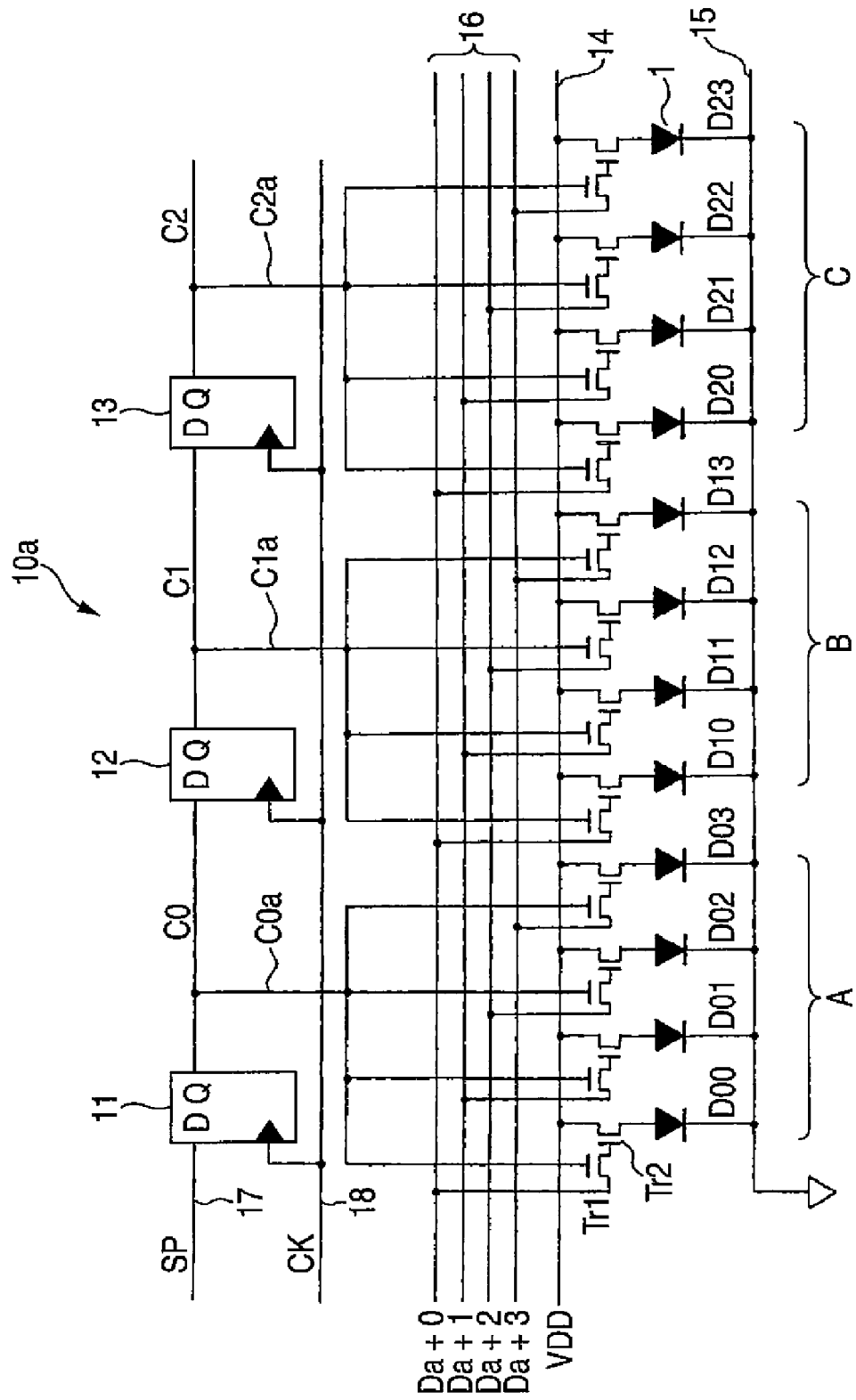
FIG. 4 is a circuit diagram of a circuit for performing the constant voltage control in the line head of FIG. 3.

In FIG. 4, a light emitting element array 1 is provided in a line head 10a. Light emitting elements D00-D23 using organic EL elements are arrayed in the light emitting element array 1. A positive power supply line 14 is connected in common to anodes of the light emitting elements D00-D23 in the light emitting element array 1. On the other hand, a negative power supply line 15 is connected to cathodes of the light emitting elements D00-D23 in the light emitting element array 1. The light emitting element array 1 is connected between the power supply lines 14 and 15.

Shift register circuits 11-13 for controlling the light emitting elements D00-D23 by the block basis. An output signal C0 of the shift register circuit 11 controls the block A including the light emitting elements D00-D03. An output signal C1 of the shift register circuit 12 controls the block B including the light emitting elements D10-D13, and an output signal C2 of the shift register circuit 13 controls the block C including the light emitting elements D20-D23.

A start pulse SP is supplied to a data terminal D of the shift register 11 through a signal line 17. A clock signal CK is supplied to the respective shift registers 11 to 13 through a signal line 18. Signal lines 16 are for supplying data signals Dat0-Dat3 to the respective light emitting elements. Driving transistors Tr2 are connected to anodes of the light emitting elements respectively. Sources of control transistors Tr1 are connected to gates of the driving transistors Tr2 respectively. The control transistors Tr1 and the driving transistors Tr2 are, for example, constituted by field effect transistors (FET).

The output signal C1 output from an output terminal Q of the shift register circuit 11 is applied through a signal line C0a to the gates of the control transistors Tr1 connected to the light emitting elements D00-D03. The output signal C1 from the shift register circuit 12 is applied through a signal line C1a to the gates of the control transistors Tr1 connected to the light emitting elements D10-D13. The output signal C2 from the shift register circuit 13 is applied through a signal line C2a to the gates of the control transistors Tr1 connected to the light emitting elements D20-D23.

In such a manner, the shift register circuit 11 selects the light emitting elements D00-D03 of the block A from the light emitting elements of the light emitting element array 1. On the other hand, the shift register circuit 12 selects the light emitting elements D10-D13 of the block B, and the shift register circuit 13 selects the light emitting elements D20-D23 of the block C.

When the output signal C0-C2 of each shift register circuit is in an H level, the signal is applied to the grates of the control transistors Tr1 for controlling the light emitting elements belonging to the corresponding block. The light emitting elements are connected in parallel between the positive power supply line 14 applied with a positive voltage VDD and the negative power supply line 15. When the shift registers are used thus, block selection can be performed with a simple pulse-driven configuration.

Next, description will be made about the data signals Dat0-Dat3 of the data lines 16. The data signals are supplied to drains of the control transistors Tr1 respectively. Accordingly, when the data signals Dat0-Dat3 are supplied to the control transistors Tr1 of the light emitting elements selected by the aforementioned block selection signals, the driving transistors Tr2 connected to the selected control transistors Tr1 are electrically connected so that the corresponding light emitting elements are activated. Incidentally, similar operation can be performed in the configuration where the block selection signals are connected to the drains of the control transistors Tr1 while the data lines are connected to the gates of the control transistors Tr1.

For example, in the block A, the data signals Dat0-Dat3 are supplied to the control transistors Tr1 for controlling the light emitting elements D00-D03, respectively. That is, the data signals Dat0-Dat3 serve as selection signals for selecting individual light emitting elements in one and the same block. In such a manner, in the line head according to the invention, individual light emitting elements can be selected and operated to be turned on. Incidentally, the data signals Dat0-Dat3 are converted from shading data to time data, and then supplied to the respective light emitting elements.

In FIG. 4, the shift register circuits 11-13 serve as the units for selecting blocks of light emitting elements as described above. The positive voltage VDD is supplied from the power supply line 14 to the light emitting elements belonging to ones of the blocks A, B and C selected by the shift register circuits 11-13. Thus, constant voltage control with the initial voltage Va is performed. In addition, constant voltage control with the voltage increased from the value Va to the value Vb as described in FIG. 1A can be performed.

Figure 5:
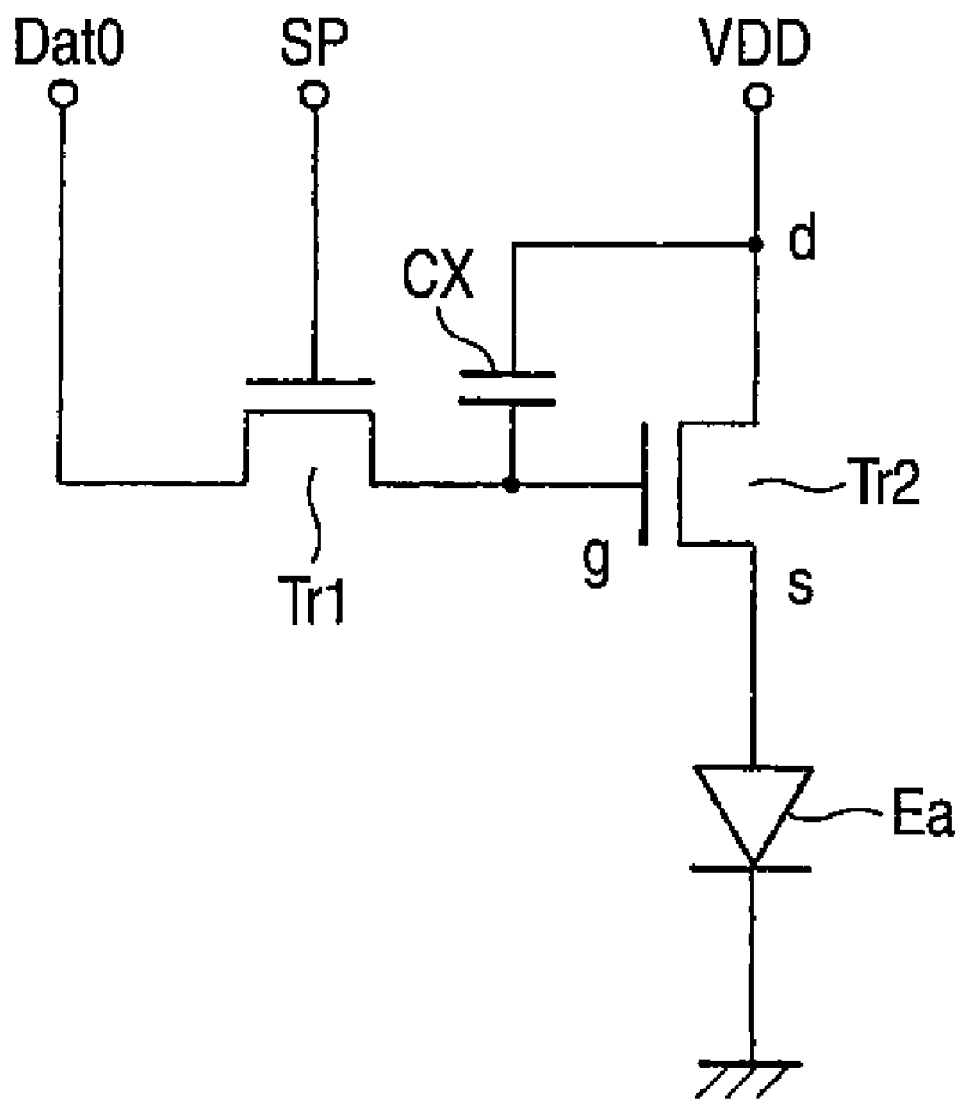
FIG. 5 is a circuit diagram showing an example of how to control the voltage applied to an individual light emitting element in FIG. 4.

FIG. 5 is a circuit diagram showing an example of how to control the voltage applied to an individual light emitting element Ea in FIG. 4. A capacitor Cx is connected between a gate electrode g and a drain electrode d of a driving transistor Tr2. When the gate electrode g and the drain electrode d of the driving transistor Tr2 are short-circuited in the configuration of FIG. 5, a gate-source voltage Vgs and a drain-source voltage Vds in the driving transistor Tr2 become equal to each other. The voltage Vgs at this time is stored in the capacitor Cx. In this event, an analog current supplied from the power supply VDD to the light emitting element Ea is switched to a constant voltage. In the invention, by use of such a principle, constant voltage control is performed upon the light emitting element Ea with the capacitor Cx being connected between the gate and the source of the driving transistor Tr2 (FET).

Figure 6:
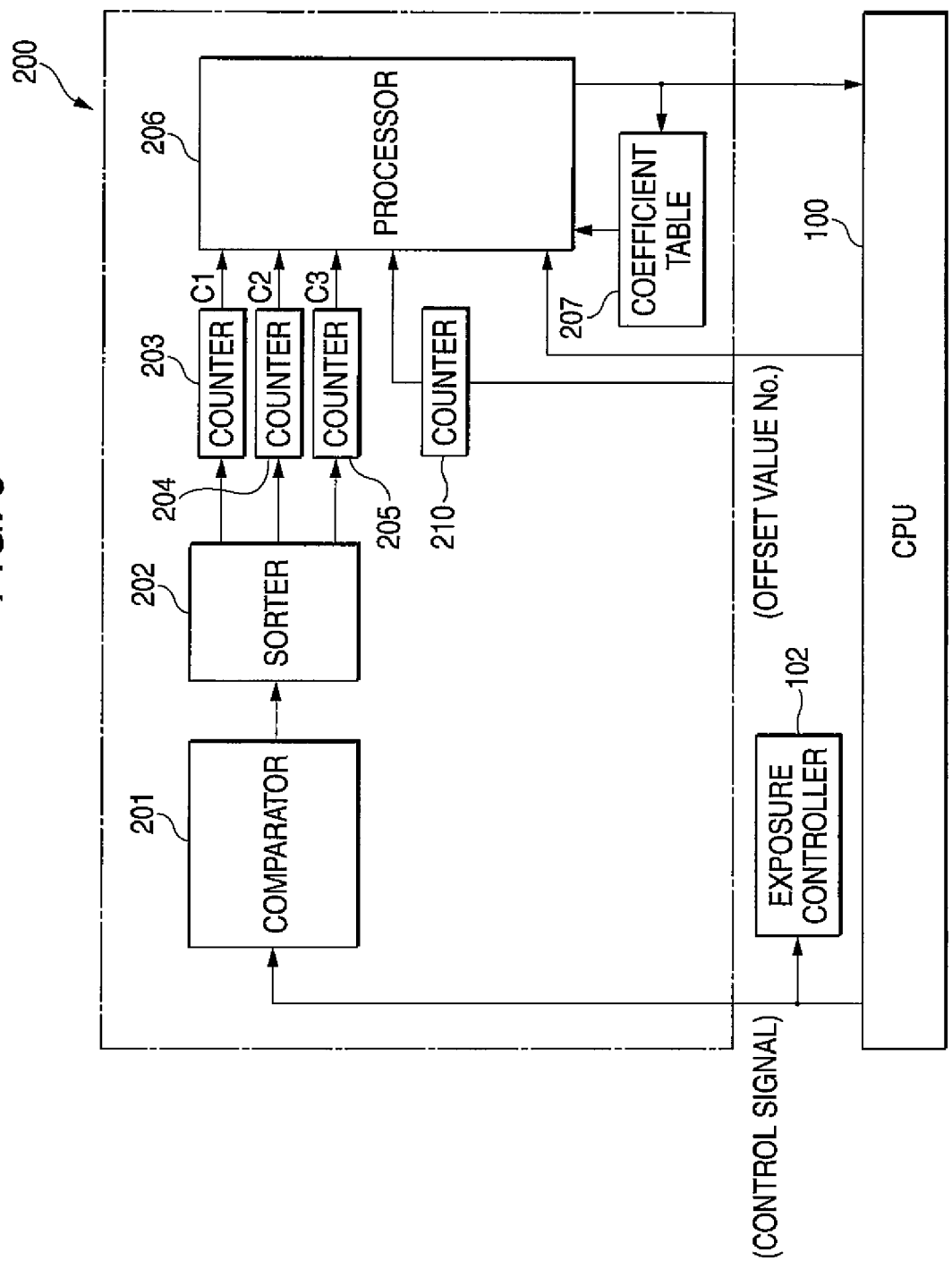
FIG. 6 is a block diagram showing an example of use of a counter shown in FIG. 2.

FIG. 6 is a block diagram showing an example of use of the counter described in FIG. 2. The use state of the line head may be determined based on a count value of a toner counter. In this example, the number of printed dot arrays is counted based on the count value of the toner counter, so as to estimate the degree of aged deterioration of each light emitting element.

In FIG. 6, the same control signals as control signals supplied from a CPU 100 to an exposure controller 102 are supplied to a toner counter 200. The control signals are signals expanded to gradation values for respective toner colors based on an image signal supplied from an external device such as the main controller 8 in FIG. 2. Based on the control signals, a comparator 201 allows only signals corresponding to printed dots whose gradation values are not lower than a predetermined threshold value. Thus, the comparator 201 supplies the allowed signals to a sorter 202. The sorter 202 determines the printed dot array state based on an output signal of the comparator 201.

That is, the sorter 202 detects the number of dots constituting a printed dot array, and determines which pattern the printed dot array should be categorized into, a pattern of dots whose gradation values are not lower than the threshold value, a pattern of four consecutive dots or a pattern of an isolated dot. The sorter 202 outputs "1" to one of counters 203-205 in accordance with the determined pattern. Here, the pattern of an isolated dot means a pattern in which a pixel having a gradation value not lower than the threshold value is put between pixels whose gradation values are lower than the threshold value. The counters 203, 204 and 205 are provided correspondingly to the pattern of dots whose gradation values are not lower than the threshold value, the pattern of four consecutive dots and the pattern of an isolated dot, respectively. In other words, each of the counters 203-205 counts the number of signals output from the sorter 202, so as to count the number of formed printed dot arrays having its corresponding pattern.

For example, assume that the control signal input into the comparator 201 is a signal corresponding to the pattern of an isolated dot. In this case, based on an output signal from the comparator 201, the sorter 202 concludes that the printed dot in question is an isolated dot. Then, the sorter 202 outputs "1" to the counter 205 while outputting "0" to the other counters 203 and 204. As a result of such a process, only the count value of the counter 205 indicating the number of formed isolated dots is increased by one.

In this event, however, there is no change in the count values of the other counters 203 and 204. In the same manner, when the control signal input into the comparator 201 is a signal corresponding to four consecutive dots, the count value of the counter 204 corresponding to the pattern of four consecutive dots is increased by one. In such a manner, the number of formed printed dots in each pattern is counted individually.

The count values C1, C2 and C3 are supplied to a processor 206. In addition to the count values C1, C2 and C3, an offset value No provided by a CPU 100 and an output from a coefficient table 207 are also supplied to the processor 206. On the other hand, the output of the processor 206 is supplied to the CPU 100 and the coefficient table 207. In the coefficient table 207, a plurality of sets of numerical values serving as candidates of "weighting coefficients" Kx, K1, K2 and K3 are stored in advance. One of the sets is selected in accordance with the output value of the processor 206.

Then, the processor 206 multiplies the count values C1, C2 and C3 output from the counters 203-205 respectively by the weighting coefficients K1, K2 and K3 selected and output from the coefficient table 207 respectively, and obtains the sum of those products. Further, the processor 206 adds the offset value No provided by the CPU 100 to the product of the obtained sum and the coefficient Kx. As a result of such calculation, toner consumption defined in Expression (1) is obtained.

$$(\text{Toner Consumption}) = Kx(K1 \cdot C1 + K2 \cdot C2 + K3 \cdot C3) + No \quad (1)$$

where Kx designates a color-dependent coefficient differing from one color to another.

In such a manner, toner consumption in each light emitting element corresponding to each dot, that is, a parameter of the operating time period of each light emitting element is counted to grasp the use state of the line head. Thus, the lowering of the emitted light amount is compensated meticulously for each light emitting element so that deterioration in image quality can be prevented.

A counter 210 counts the operating time period of the line head measured by a timer or a program timer, that is, the cumulative operating time period of the light emitting elements. The counted result is supplied from the counter 210 to the processor 206 so that the cumulative operating time period of the light emitting elements is calculated. The cumulative operating time period of the light emitting elements calculated by the processor 206 is supplied to the CPU 100. Based on the cumulative operating time period of the line head, the CPU 100 forms a control signal for performing voltage control upon the light emitting elements as shown in FIG. 1A.

In such a manner, due to use of the counter 210, the characteristic proper to organic EL elements in which the emitted light amount is lowered when the operating time period exceeds a predetermined time period is compensated so that deterioration in image quality can be prevented. The counter 210 may be designed not to count the cumulative operating time period of the line head but to count an item serving as a parameter of the operating time period of the light emitting elements, for example, to count the number of printed sheets of recording paper or to count the number of pulses of a vertical synchronizing signal (Vsync) for image formation. The counter for counting the number of printed sheets of recording paper can be supported by a sensor provided in a sheet feeding path or the like. Thus, the configuration can be made simple.

Figure 7:
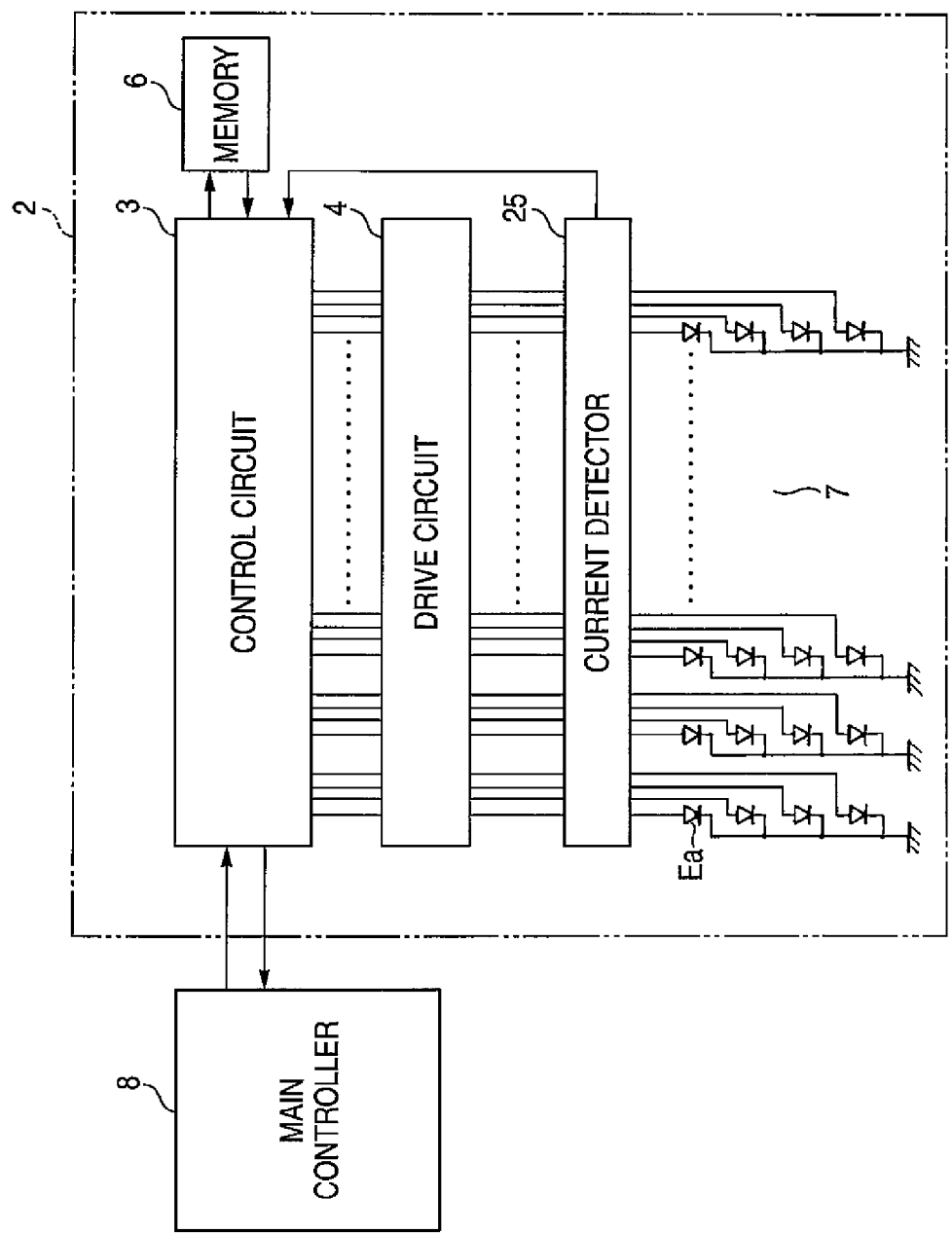
FIG. 7 is a block diagram showing the schematic configuration of a control section of a line head according to a second embodiment of the invention.

FIG. 7 shows a second embodiment of the invention. Components similar to those in the first embodiment will be designated by the same reference numerals and repetitive explanations for those will be omitted.

In this embodiment, a current detector 25 serves to measure the current flowing in each of the light emitting elements which corresponds to the light emitting state thereof. The detected current value is fed back to the control circuit 3.

The control circuit 3 reads out the relationship between the operating time period and the emitted light amount (see FIG. 1B) which is stored in the memory 6, and compares with the current value detected by the current detector 25.

As a result of the comparison, when it is concluded that the emitted light amount has been lowered to a value corresponding to the operating time period of 250 hours or more, constant voltage control is performed with the applied voltage being increased from the value Va to the value Vb. In such a manner, constant voltage control is performed upon the light emitting elements individually by the drive circuit 4. Thus, a high quality image can be formed even when the driving time of each light emitting element exceeds a predetermined time.

In addition, since the control circuit 3 always compares with the current value detected by the current detector 25 and the relationship stored in the memory 6, the lowering of the emitted light amount caused by the long time operation of the light emitting element is dealt with rapidly so that deterioration in image quality can be prevented.

In this embodiment, the drive circuit 4 applies voltages to the individual light emitting elements Ea respectively so as to perform constant voltage control. However, one and the same voltage may be applied to all the light emitting elements forming the same array extending in the primary scanning direction so as to drive the light emitting elements. With such a configuration, constant voltage control can be performed upon a plurality of light emitting elements more simply.

Figure 8:
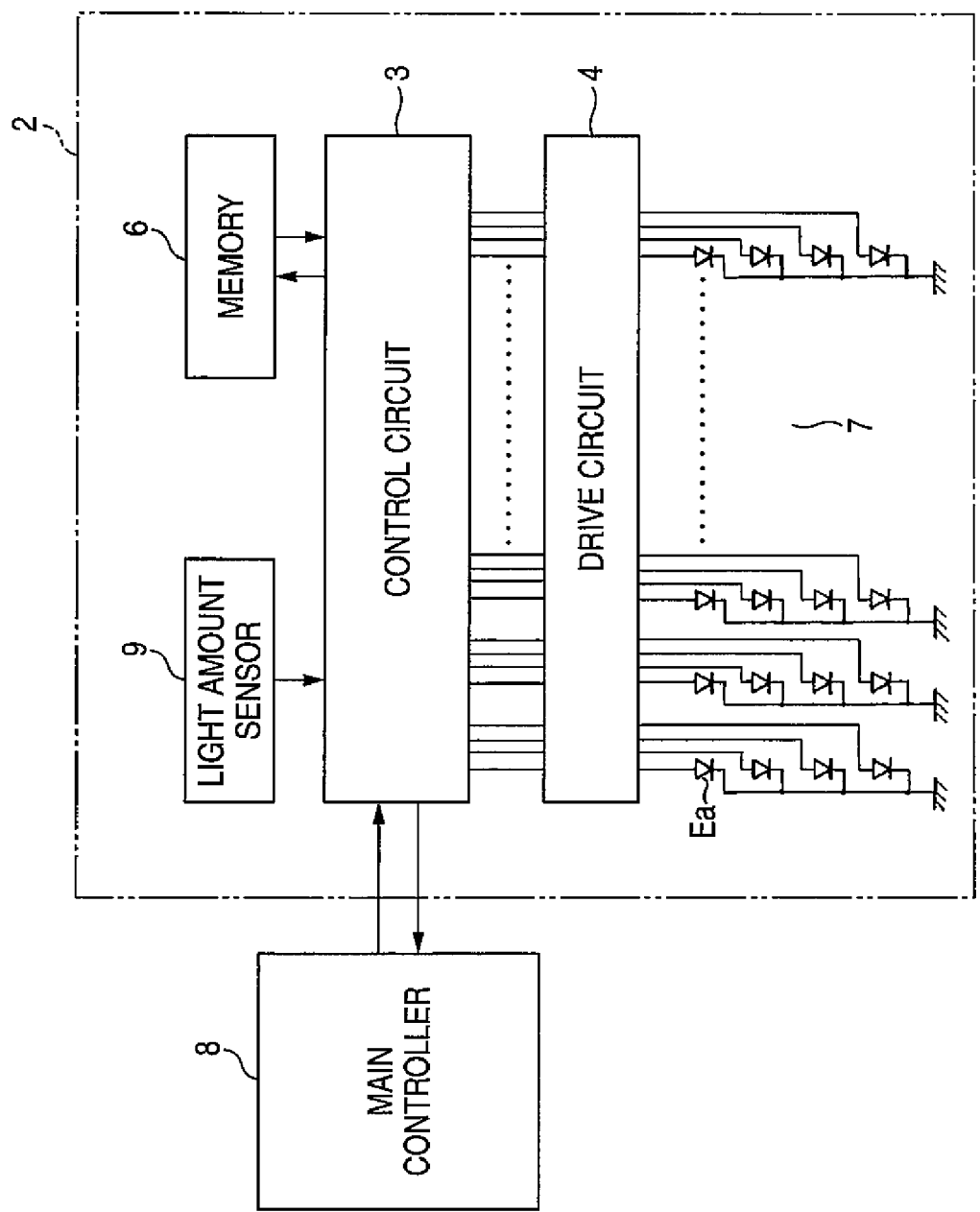
FIG. 8 is a block diagram showing the schematic configuration of a control section of a line head according to a third embodiment of the invention.

FIG. 8 shows a third embodiment of the invention. Components similar to those in the first embodiment will be designated by the same reference numerals and repetitive explanations for those will be omitted.

In this embodiment, a light amount sensor 9 is provided in place of the current detector 5 shown in FIG. 7, and a detection signal of the light amount sensor 9 is input to the control circuit 3. The light amount sensor 9 serves to measure the optical characteristic of each light emitting element.

The control circuit 3 reads out the relationship between the operating time period and the emitted light amount (see FIG. 1B) which is stored in the memory 6, and compares with the light amount value detected by the light amount sensor 9. As a result of the comparison, when it is concluded that the emitted light amount has been lowered to a value corresponding to the operating time period of 250 hours or more, the driving circuit 4 performs constant voltage control with the applied voltage being increased from the value Va to the value Vb. Deterioration in image quality caused by the lowering of the emitted light amount can be prevented even by use of such an optical sensor.

Next, a fourth embodiment of the invention will be described with reference to FIGS. 9A to 10. Components similar to those in the first embodiment will be designated by the same reference numerals and repetitive explanations for those will be omitted.

Figure 9A:
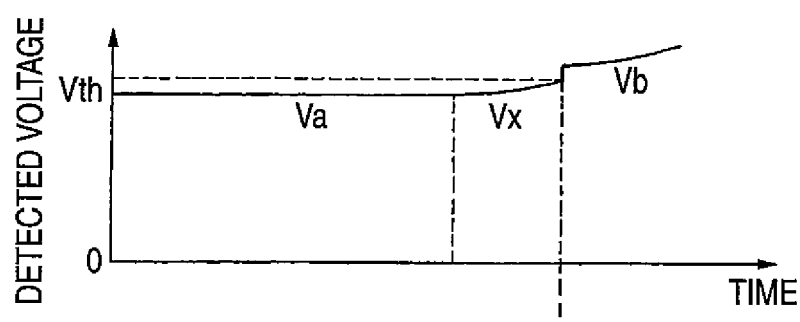
FIG. 9A is a diagram showing the relationship between the operating time period of each light emitting element in a line head according to a fourth embodiment of the invention and the voltage value detected from the light emitting element.
Figure 9B:
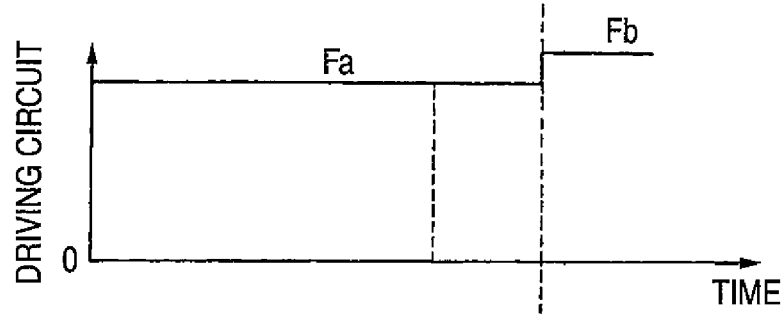
FIG. 9B is a diagram showing the relationship between the operating time period of the light emitting element of FIG. 9A and the current value applied to the light emitting element.
Figure 9C:
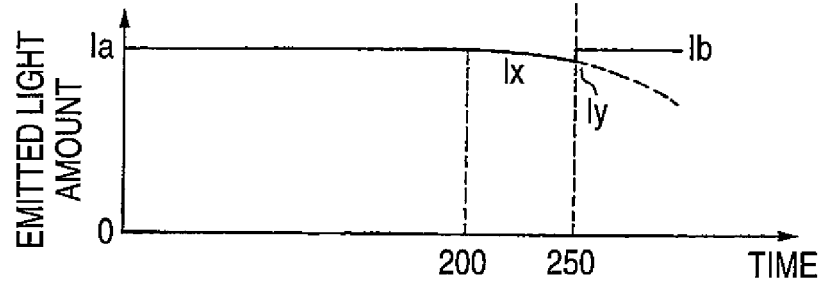
FIG. 9C is a diagram showing the relationship between the operating time period of the light emitting element of FIG. 9A and the emitted light amount therefrom.

As shown in FIG. 9B, each light emitting element is controlled with a constant current Fa after driving the light emitting element is started and till 200 hours have passed. In this period, the amount of light emission is constant to be Ia as shown in FIG. 9C, and the detected voltage of the light emitting element is Va lower than a threshold value Vth as shown in FIG. 9A. When 200 hours have passed since the start of driving the light emitting element, the amount of light emission tends to be lower than the value Ia (FIG. 9C). This is caused by increase in resistance of the material of the organic EL devices etc. due to temperature rise, with the result that the efficiency in light emission is lowered with respect to a fixed current.

In such a manner, when 200 hours have passed since the start of driving the light emitting element, the resistance of the light emitting element increases so that the detected voltage rises when a constant current is applied to the light emitting element as shown in FIG. 9A. When constant current control is performed upon each light emitting element, the voltage of the light emitting element is detected, and the detected voltage is compared with the predetermined threshold voltage Vth (reference value). When the detected voltage exceeds the threshold voltage Vth, constant current control is performed with the driving current being increased to a value Fb as shown in FIG. 9B.

The constant current control with the driving current being increased from the value Fa to the value Fb is initiated as soon as the operating time of the light emitting element exceeds 250 hours in the example of FIGS. 9A-9C. In this event, the amount of light emission is restored from a value Ix to a value Ib substantially equal to the value Ia which is the amount of light emission at the beginning of driving the light emitting element as shown in FIG. 9C. In addition, the detected voltage of the light emitting element rises from a value Vx to a value Vb.

As is apparent from FIG. 9C, when the operating time of the light emitting element exceeds a predetermined time period, for example, 200 hours, and approaches 250 hours during the constant current control on the light emitting element, the amount of light emission is lowered so that a desired image cannot be formed. In this event, the detected voltage of the light emitting element approaches the level of the reference value (threshold voltage Vth) as shown in FIG. 9A.

In this embodiment, constant current control is performed upon each light emitting element with the driving current being changed in accordance with the operating time of the light emitting element. In such a manner, current control to be perform upon each light emitting element is a constant current control in which the value of a current applied to the light emitting element is changed stepwise in accordance with the operating time of the light emitting element. Thus, deterioration in image quality can be prevented in a simple way.

Figure 10:
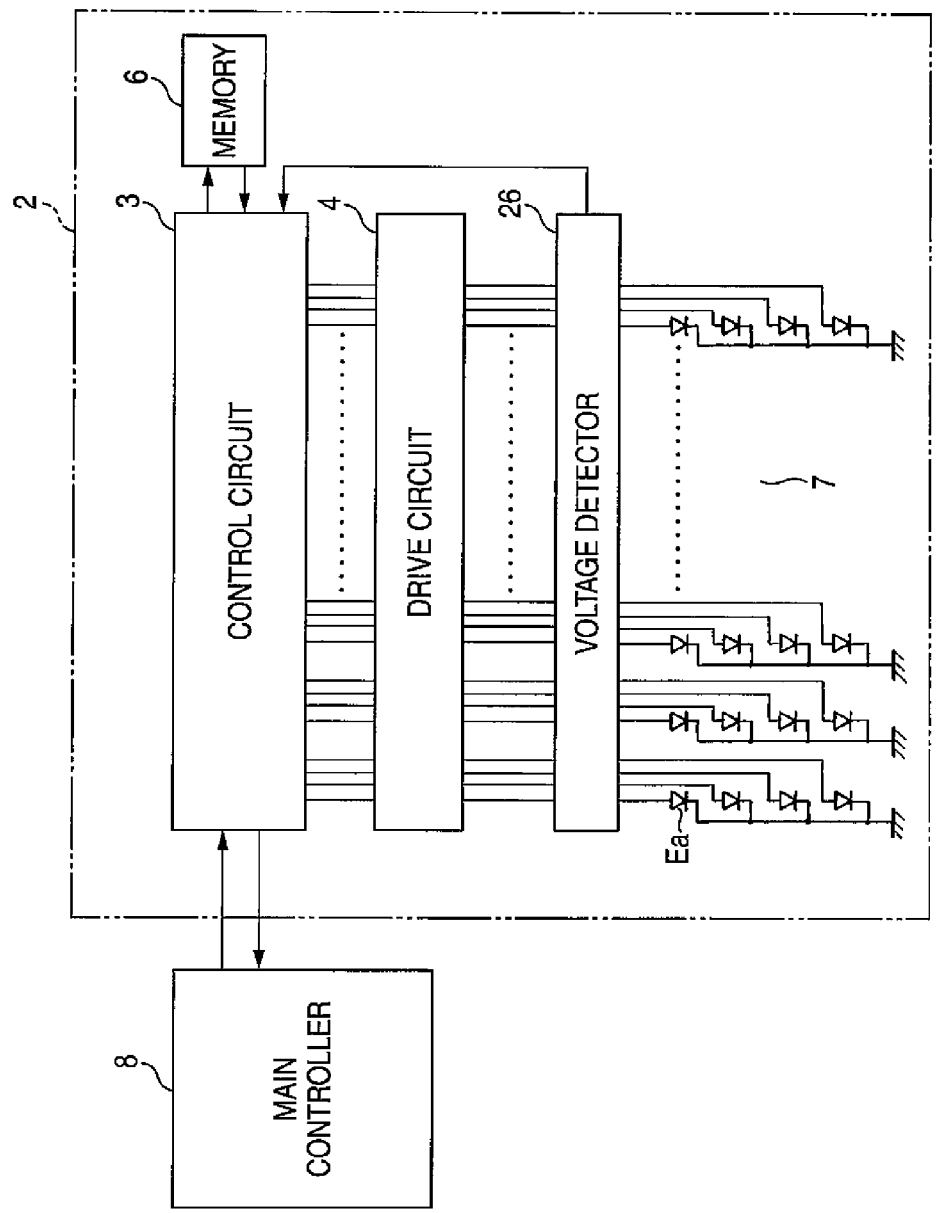
FIG. 10 is a block diagram showing the schematic configuration of a control section of the line head of FIG. 9A.

As shown in FIG. 10, in this embodiment, a voltage detector 26 is provided such that the detected voltage value for each light emitting element is fed back to the control circuit 3.

The main controller 8 forms print data and transmits the print data to the control section 2 of the line head. The memory 6 stores a characteristic of each light emitting element Ea, such as a threshold voltage Vth shown in FIG. 9A and a relationship between the operating time period and the emitted light amount shown in FIG. 9C. The main controller 8 generates data indicative of a relationship between the operating time period and the applied current value shown in FIG. 9B, and transmits the generated data to the control circuit 3. The control circuit 3 stores the received data in the memory 6.

The control circuit 3 reads the threshold voltage Vth from the memory 6, and compares the threshold voltage Vth with the fed-back detected voltage of each light emitting element. Based on the comparison result, the control circuit 3 forms a control signal for each light emitting element so as to operate the driving circuit 4 to thereby perform constant current control upon the light emitting element. In such a manner, constant current control is performed upon the light emitting elements individually by the drive circuit 4. Thus, a high quality image can be formed even when the operating time of each light emitting element exceeds a predetermined time period.

Incidentally, the drive circuit 4 applies predetermined voltages to the individual light emitting elements Ea respectively so as to perform constant current control. However, one and the same current may be applied to all the light emitting elements forming the same array extending in the primary scanning direction so as to drive the light emitting elements. In spite of differences in light emission characteristic among the individual light emitting elements, the degree of deterioration in image quality will be not significant even if the light emitting elements are driven with one and the same current. With such a configuration, constant current control can be performed upon a plurality of light emitting elements more simply.

In this embodiment, a plurality of light emitting element arrays are provided in the secondary scanning direction of a line head. Accordingly, the line head can be applied to multiple exposure. In addition, an image can be formed by one array extending in the primary scanning direction while the other arrays serve as spares for failure of the image forming array. In such a manner, the image forming apparatus can be applied to various applications due to the plurality of light emitting element arrays provided in the secondary scanning direction of the line head.

Figure 11:
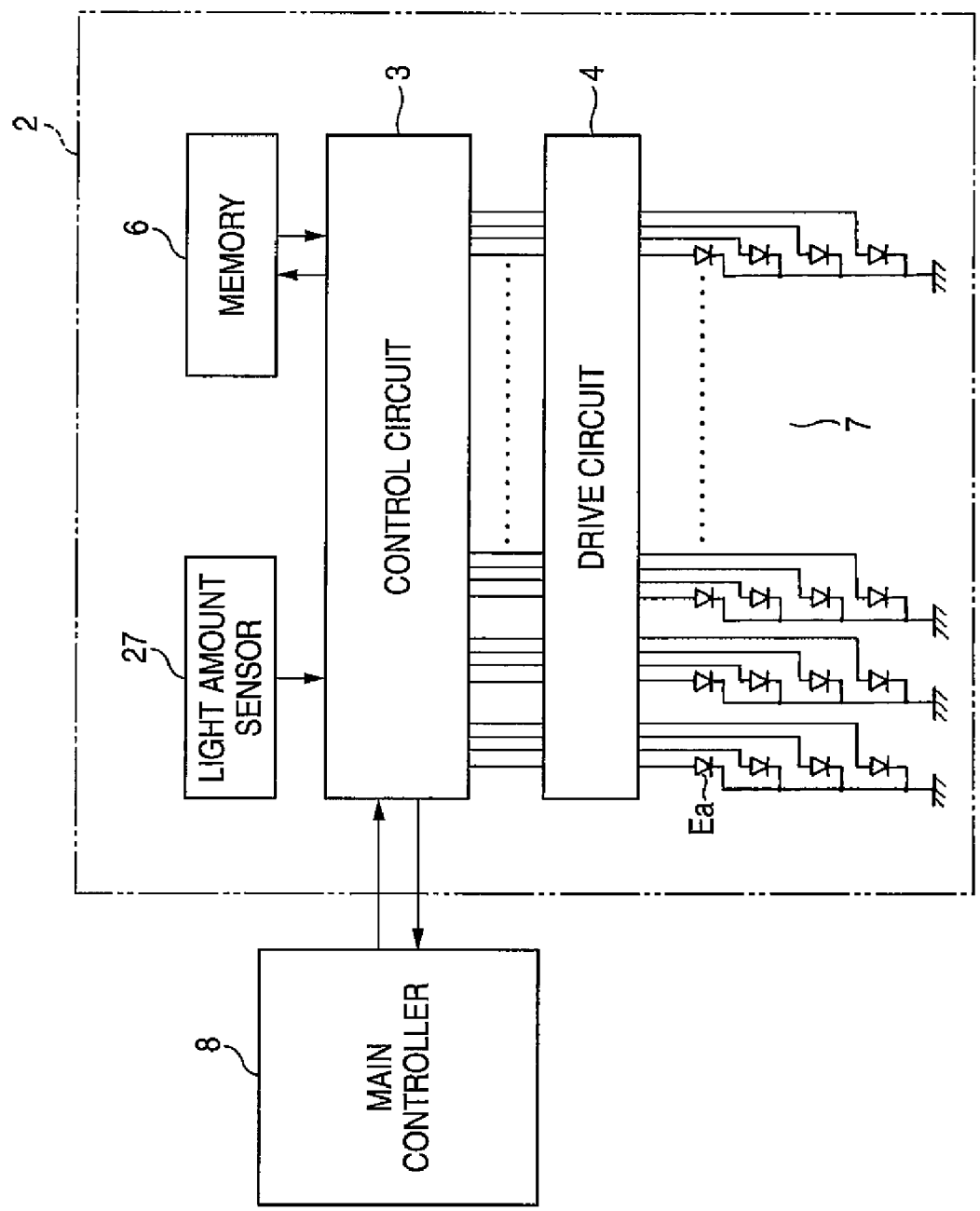
FIG. 11 is a block diagram showing the schematic configuration of a control section of a line head according to a fifth embodiment of the invention.

FIG. 11 shows a fifth embodiment of the invention. Components similar to those in the fourth embodiment will be designated by the same reference numerals and repetitive explanations for those will be omitted.

In this embodiment, a light amount sensor 9 is provided in place of the voltage detector 26 shown in FIG. 10, and a measurement signal of the light amount sensor 9 is input into the control circuit 3.

When each light emitting element is to be driven, the control circuit 3 reads the aforementioned relationship data from the memory 6, and compares this with the measurement signal from the light amount sensor 9. When the operating time of the light emitting element exceeds 200 hours, a value measured by the light amount sensor 9 decreases along the characteristic Ix in FIG. 9C. When the operating time of the light emitting element is accumulated to reach 250 hours, the amount of light emission decreases to the value Iy. In this event, the control circuit 3 increases the driving current from the value Ia to the value Ib so as to perform constant current control upon each light emitting element in the same manner as in the fourth embodiment. That is, the light emission amount Iy when the operating time reaches 250 hours serves as a reference value for determining whether to increase the driving current from the value Fa to the value Fb or not.

The constant current control describe the above can be performed not only in the element basis, but also in the block basis as explained with reference to FIGS. 3 and 4.

Figure 12:
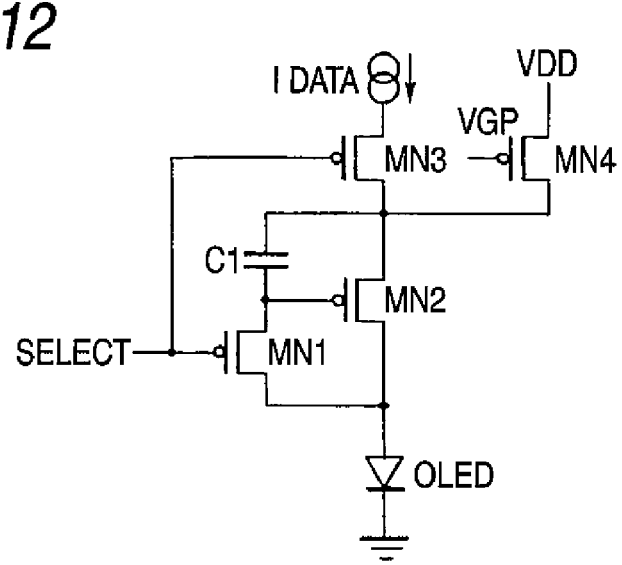
FIG. 12 is a circuit diagram showing an example of constant current control of the light emitting element.
Figure 13:
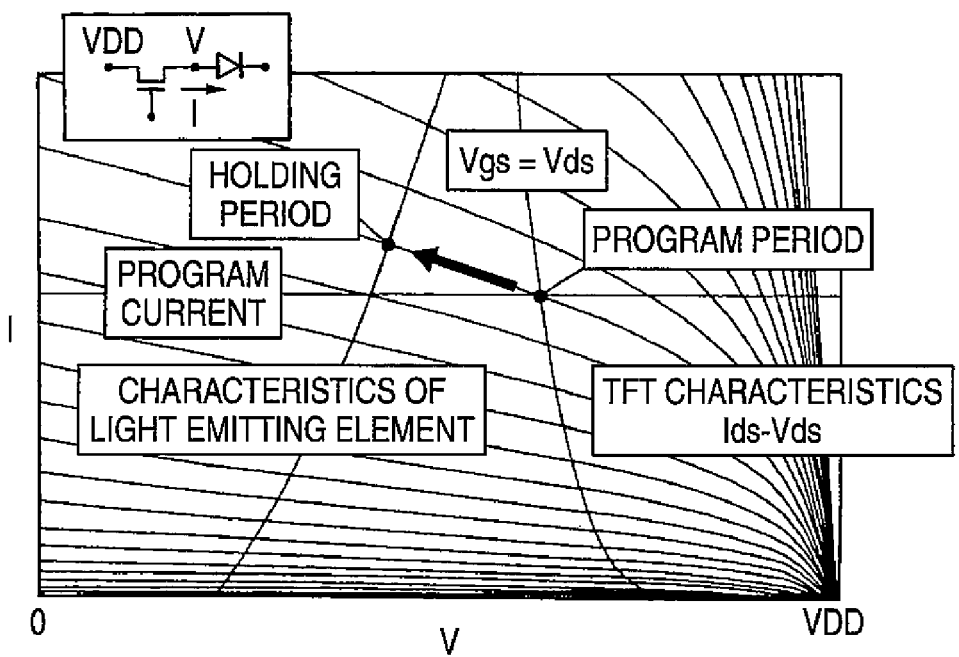
FIG. 13 is a characteristic diagram showing the principle of operation of a driver transistor and a light emitting element comprised of an organic EL device which are shown in FIG. 12.

FIG. 12 is a circuit diagram showing an example of constant current control of a light emitting element. FIG. 13 is a characteristic diagram showing the principle of operation of a driver transistor MN2 and a light emitting element Ea comprised of an organic EL device. The drive system shown in FIG. 12 is called "current program gradation".

The current program gradation was developed for a light emitting polymer display which is disclosed in the article of "Low-Temperature Poly-Si TFT Driven Light Emitting Polymer Display" in "Liquid Crystal Display Technology 2001" which is an annex of "Electronic Materials, July (2001)" published by Kogyo Chosakai Publishing Inc. The current program gradation serves to suppress a variation in emission luminance caused by variations in all the properties.

In FIG. 12, the reference sign MN1 represents a transistor to which a selection signal for selecting a light emitting element (OLED) made of an organic EL device is input; MN2, a driver transistor; MN3, a transistor to which a current from a constant current source (IData) is supplied; and MN4, a switching transistor for turning on/off a power supply voltage (VDD). The reference sign C1 represents a capacitor connected between a gate electrode and a drain electrode of the driver transistor MN2. Each transistor MN1-MN4 is constituted by a TFT.

FIG. 13 shows the characteristic as to the relationship between the drain-source current (Ids) and the drain-source voltage (Vds) in the driver transistor MN2. In addition, the current to voltage characteristic of the light emitting element (OLED) is also shown. A program current corresponds to a target value of constant current control.

In a current program period (constant current control period), the gate electrode and the drain electrode of the TFT are short-circuited to establish the relation Vgs=Vds, and a gradation signal is supplied to the TFT as an analog current. The voltage Vgs at this time is stored in the capacitor C1. In a holding period, the analog current is switched to the constant voltage VDD so that the operating point is located in an intersection point of the I-V characteristics of the TFT and the light emitting element OLED. The TFT operates in a saturation region in both the current program period and the holding period. Accordingly, a current equal in amount to the program current is supplied also in the holding period. That is, constant current control is performed on the light emitting element.

The current program gradation is characterized in that the variation in emission luminance caused by the variations in all the properties of the TFT and the light emitting element can be suppressed by use of the saturation region of the TFT. In addition, in spite of constant current control, constant current sources as many as light emitting elements are not required, but the light emitting portions may be connected to one constant voltage source VDD. Thus, the configuration becomes simple.

Figure 14:
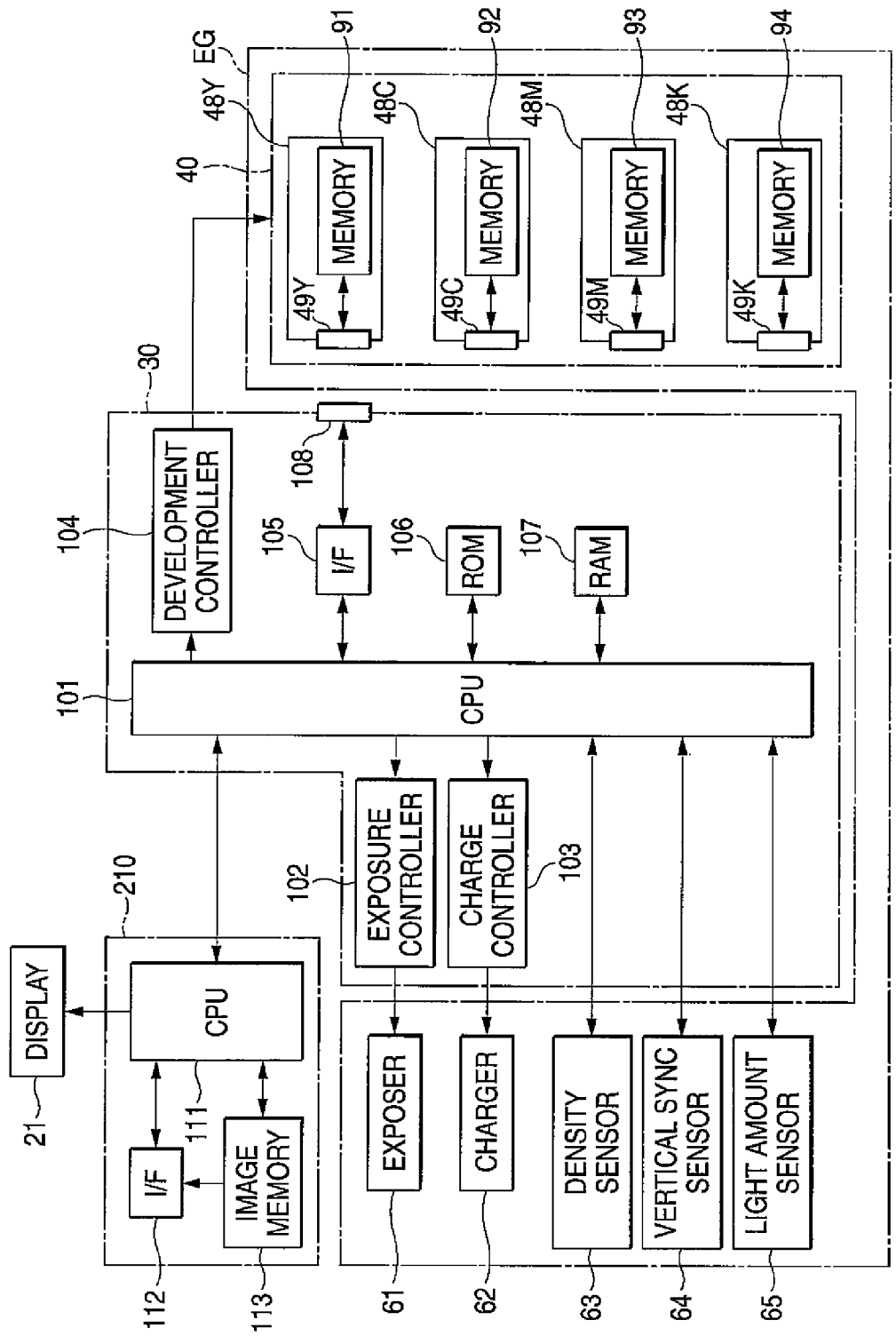
FIG. 14 is a block diagram showing the configuration of a control section of an image forming apparatus incorporating the line head of the invention.

FIG. 14 is a block diagram showing the configuration of a control section of an image forming apparatus incorporating the line head of the invention. An image signal is supplied from an external device such as a host computer to a main controller 20 in response to an image forming request from a user. In this event, a command signal is transmitted from the main controller 20 to an engine controller 30. In response to the command signal, the engine controller 30 controls each part of an engine section EG so as to form an image corresponding to the image signal on a recording medium.

In the engine section EG, a charging bias is applied from a charge controller 103 to a charger 62 so as to charge the outer circumferential surface of a photoconductor uniformly with predetermined surface potential. Then, the outer circumferential surface of the photoconductor charged by the charger 62 is irradiated with a light beam from an exposer 61. The exposer 61 exposes the photoconductor to the light beam in accordance with a control command supplied from an exposure controller 102 so as to form an electrostatic latent image corresponding to the image signal. The exposer 61 is provided with suitable optical elements such as lenses, mirrors, etc.

When an image signal is supplied to a CPU 111 of the main controller 20 through an interface 112 by an external device such as a host computer, a CPU 101 of the engine controller 30 outputs a control signal corresponding to the image signal to the exposure controller 102 at predetermined timing. The photoconductor is irradiated with a light beam from the exposer 61 in accordance with the control signal so that an electrostatic latent image corresponding to the image signal is formed on the photoconductor.

A developing device 40 is controlled by a development controller 104. Here, a developing bias in which a DC voltage and an AC voltage have been superimposed is applied from the development controller 104 to a developing roller. Due to the developing bias applied thus, toner carried on the developing roller adheres partially to each part of the surface of the photoconductor in accordance with its surface potential. Thus, the electrostatic latent image on the photoconductor is developed as a toner image of a color corresponding to the toner.

A vertical synchronizing sensor 64 is a sensor for detecting a reference position of an intermediate transfer belt. The vertical synchronizing sensor 64 serves to obtain a synchronizing signal output in relation to the rotational driving of the intermediate transfer belt, that is, a vertical synchronizing signal $V_{sync}$. In this apparatus, the operation of each part of the apparatus is controlled based on the vertical synchronizing signal $V_{sync}$ so as to synchronize the operation timings of the parts to one another and superimpose toner images formed in respective colors on one another accurately.

Further, a density sensor 63 is provided to face the surface of the intermediate transfer belt. The density sensor 63 measures the optical density of a patch image formed on the outer circumferential surface of the intermediate transfer belt in a density control process. A light amount sensor 65 corresponds to the light amount sensor 9 in FIG. 11. In addition, through not shown, the voltage detector 26 in FIG. 10 may be provided to input a detected voltage of each light emitting element into the CPU 101.

As shown in FIG. 14, developing devices (toner cartridges) 48Y, 48C, 48M and 48K are provided with memories 91-94 for storing data about production lots and use histories of the developing devices, remaining amounts of internally stored toners, etc., respectively. Further, the developing devices 48Y, 48C, 48M and 48K are provided with connectors 49Y, 49C, 49M and 49K respectively.

The connectors 49Y, 49C, 49M and 49K are selectively connected to a connector 108 provided on the body side, in accordance with necessity. To this end, data are transmitted and received between the CPU 101 of the engine controller 30 and each memory 91-94 through an interface 105 so as to manage various information items such as management of expendable items about the corresponding developing device (toner cartridge). In this embodiment, mutual data exchange is attained by mechanical fitting between the body-side connector 108 and the developing device-side connector 49K or the like. However, data exchange may be attained in a non-contact manner using an electromagnetic technique such as wireless communication.

It is desired that the memories 91-94 for storing data proper to the developing devices 48Y, 48C, 48M and 48K respectively are nonvolatile memories which can store data even if the power is off or even if the developing devices are removed from the body. As such nonvolatile memories, for example, flash memories, ferroelectric random access memories (FRAMs), EEPROMs, etc. can be used.

In the image forming apparatus, a display 21 is provided as shown in FIG. 14. A predetermined message is displayed in accordance with a control command given by the CPU 111 if necessary. Thus, the user is notified of necessary information. For example, when there occurs an abnormality such as a failure of the apparatus or a paper jam, a message for notifying the user of that fact is displayed. When the remaining toner amount in one of the developing devices is not larger than a predetermined value, for example, when the remaining toner amount falls to a near end value which will be described later, a message for urging the user to exchange the developing device in question is displayed.

For example, a liquid crystal display can be used as the display 21. Alternatively, a warning lamp to light or blink may be used in accordance with necessity. Further, in addition to the message displayed for visual notification to the user, a warning device using a voice message recorded in advance or a sound such as a buzzer may be used, or these methods may be used in suitable combination.

An image memory 113 is provided for storing an image given through the interface 112 by an external device such as a host computer. The reference numeral 106 represents a ROM for storing computing programs to be executed by the CPU 1011 control data for controlling the engine section EG, etc. The reference numeral 107 represents a RAM for temporarily storing computing results obtained by the CPU 101, or other data. An FRAM may be used as the RAM 107.

Figure 15:
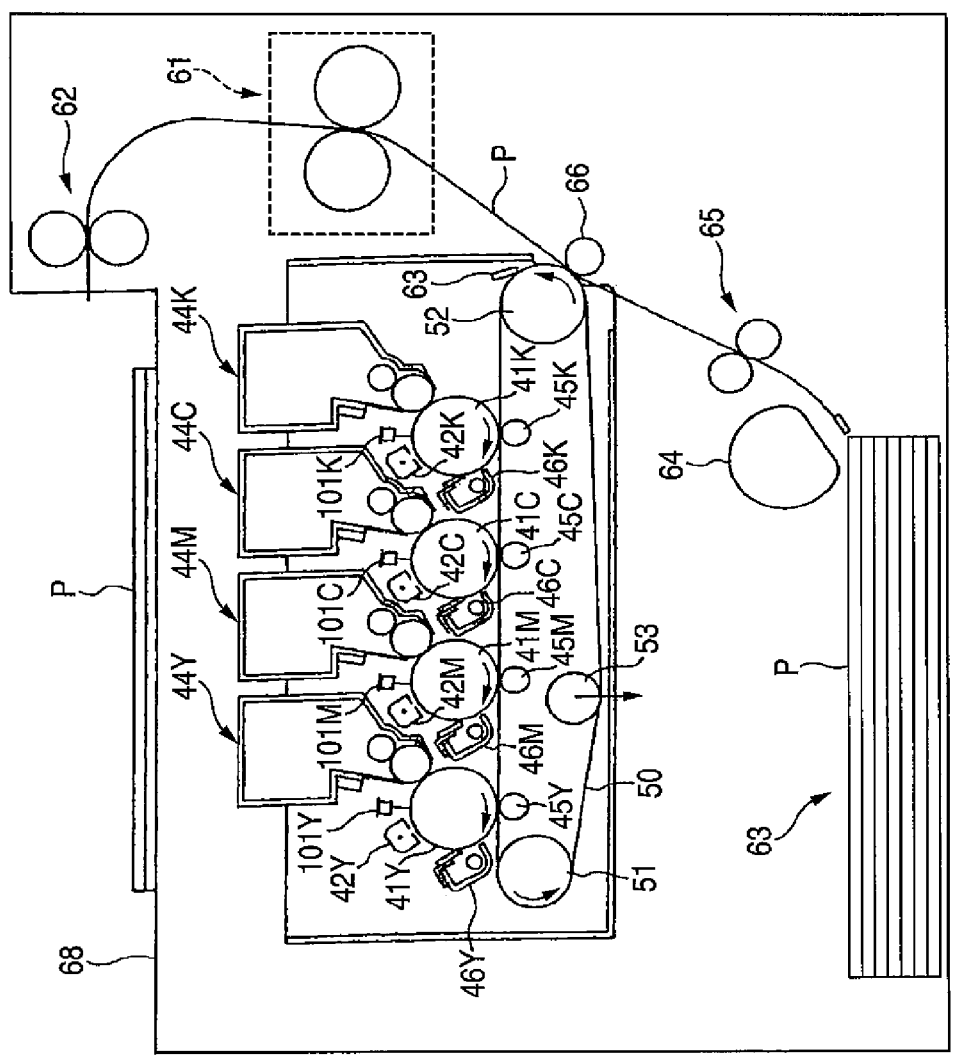
FIG. 15 is a schematic section view of a first example of an image forming apparatus incorporating the line head of the invention.

According to the invention, line heads configured thus can be used, for example, as exposure heads in image forming apparatus for forming a color image in an electrophotographic manner. FIG. 15 shows such an image forming apparatus using line heads. This image forming apparatus is designed as tandem type image forming apparatus in which four line heads 101K, 109C, 101M and 101Y configured similarly are disposed in exposure positions of four photoconductor drums (image carriers) 41K, 49C, 41M and 41Y configured similarly and correspondingly to the line heads 101K, 109C, 101M and 101Y, respectively.

As shown in FIG. 15, the image forming apparatus is provided with a driving roller 51, a follower roller 52, a tension roller 53 and an intermediate transfer belt 50. The intermediate transfer belt 50 is stretched due to tension applied thereto by the tension roller 53, and driven to circulate in the illustrated arrow direction (counterclockwise). The photoconductors 41K, 49C, 41M and 41Y having photoconductor layers on their outer circumferential surfaces and serving as four image carriers are disposed at predetermined intervals with respect to the intermediate transfer belt 50.

The suffixes K, C, M and Y added to the reference numerals designate black, cyan, magenta and yellow respectively. The reference numerals 41K, 49C, 41M and 41Y represent black, cyan, magenta and yellow photoconductors respectively. The same thing is applied to the other members. The photoconductors 41K, 49C, 41M and 41Y are driven to rotate in the illustrated arrow directions (clockwise) synchronously with the driving of the intermediate transfer belt 50 respectively.

A charger (corona charger) 42 (K, C, M, Y) and the line head 101 (K, C, M, Y) according to the invention as described above are provided around each photoconductor 41 (K, C, M, Y). The charger 42 (K, C, M, Y) charges the outer circumferential surface of the photoconductor 41 (K, C, M, Y) uniformly. The line head 101 (K, C, M, Y) performs a line scan in turn upon the outer circumferential surface charged uniformly by the charger 42 (K, C, M, Y). The line scan is performed in sync with the rotation of the photoconductor 41 (K, C, M, Y).

The image forming apparatus is also provided with developing devices 44 (K, C, M and Y), primary transfer rollers 45 (K, C, M and Y) and cleaners 46 (K, C, M and Y). Each developing device 44 (K, C, M, Y) imparts toner as developer to an electrostatic latent image formed by the line head 101 (K, C, M, Y), so as to form a visible image (toner image). Each primary transfer roller 45 (K, C, M, Y) serves as a transfer unit for transferring the toner image developed by the developing device 44 (K, C, M, Y) in turn to the intermediate transfer belt 50 as a target of primary transfer. Each cleaner 46 (K, C, M, Y) removes the toner remaining on the surface of the photoconductor 41 (K, C, M, Y) after the transfer.

Here, each line head 101 (K, C, M, Y) is disposed so that the array direction of the line head 101 (K, C, M, Y) is parallel to the generatrix of the photoconductor drum 41 (K, C, M, Y). In addition, the light emission energy peak wavelength of the line head 101 (K, C, M, Y) is set substantially equal to the sensitivity peak wavelength of the photoconductor 41 (K, C, M, Y).

For example, each developing device 44 (K, C, M, Y) uses a non-magnetic monocomponent toner as developer. The monocomponent toner is conveyed to a developing roller, for example, by a supply roller. The film thickness of the developer adhering to the surface of the developing roller is regulated by a control blade, while the developing roller is brought into abutment or pressure-contact against the photoconductor 41 (K, C, M, Y). Thus, the developer is attached to the photoconductor 41 (K, C, M, Y) in accordance with the potential level thereof so as to be developed as a toner image.

Black, cyan, magenta and yellow toner images formed by the four monochrome toner image forming stations configured thus are primarily transferred in turn onto the intermediate transfer belt 50 by primary-transfer bias applied to the primary transfer rollers 45 (K, C, M and Y). A full-color toner image obtained by superimposing the four toner images on the intermediate transfer belt 50 is secondarily transferred onto a recording medium P such as paper by a secondary transfer roller 66. When the recording medium P passes through a fixing roller pair 61 as a fixing portion, the full-color toner image is fixed on the recording medium P. By an ejection roller pair 62, the recording medium P is ejected onto an ejection tray 68 formed in a top portion of the apparatus.

Incidentally, in FIG. 15, the reference numeral 63 represents a sheet feeding cassette in which a large number of recording media P are stacked and retained. A pickup roller 64 feeds the recording media P from the sheet feeding cassette 63 one by one. A gate roller pair 65 regulates the timing when the recording medium P is fed to a secondary transfer position which is formed by a secondary transfer roller 66 and the intermediate transfer belt 50. A cleaning blade 67 removes toner remaining on the surface of the intermediate transfer belt 50 after the secondary transfer. A counter for counting the number of sheets of recording paper fed for printing is provided in a suitable position in a conveyance path of the recording media P, for example, in a suitable position between the sheet feeding cassette 63 and the gate roller pair 65.

With the configuration in which an array of light emitting elements each of which is constituted by an organic EL element is used as an image writer, the apparatus can be downsized as compared with an apparatus using laser scanning optics. According to the invention, in the tandem type image forming apparatus as shown in FIG. 15, in which constant voltage/current control is performed on light emitting elements, it is possible to prevent the image quality from deteriorating when the operating time of each light emitting element exceeds a predetermined time period.

Next, description will be made about another example of image forming apparatus incorporating the line head of the invention with reference to FIG. 16. This image forming apparatus 160 comprises a developing device 161 having a rotary configuration, a photoconductor drum 165 serving as an image carrier, an image writer (line head) provided with an organic EL element array, an intermediate transfer belt 169, a sheet conveyance path 174, a heating roller 172 of a fuser, and a sheet feeding tray 178.

In the developing device 161, a developing rotary 161a rotates around a shaft 161b in the direction of the arrow A. The inside of the developing rotary 161a is divided into four. The four portions are provided with four image forming units of yellow (Y), cyan (C), magenta (M) and black (K) respectively. The reference numerals 162a-162d designate developing rollers disposed in the four color image forming units respectively, so as to rotate in the direction of the arrow B. The reference numerals 163a-163d designate toner supply rollers rotating in the direction of the arrow C. The reference numerals 164a-164d designate control blades for regulating toner thickness.

The photoconductor drum 165 is driven in the direction of the arrow D opposite to the developing roller 162a by a not-shown drive motor, for example, a step motor.

The intermediate transfer belt 169 is stretched between a driving roller 170a and a follower roller 170b. The driving roller 170a is coupled with the aforementioned drive motor of the photoconductor drum 165 so as to transmit power to the intermediate transfer belt. Driven by the drive motor, the driving roller 170a of the intermediate transfer belt 169 is rotated in the direction of the arrow E opposite to the photoconductor drum 165.

A plurality of conveyance rollers, an ejection roller pair 176, etc. are provided in the sheet conveyance path 174 so as to convey a recording medium such as paper. A one-side image (toner image) carried on the intermediate transfer belt 169 is transferred onto one side of the paper in the position of a secondary transfer roller 171. The secondary transfer roller 171 is retractably brought into contact with the intermediate transfer belt 169 by a clutch mechanism so that the image is transferred to the paper.

The paper having the image transferred thereto thus is next subjected to a fixing process in a fuser having a heater. The fuser is provided with a heating roller 172 and a pressure roller 173. The paper subjected to the fixing process is pulled in by the ejection roller pair 176 so as to travel in the direction of the arrow F. When the ejection roller pair 176 rotate reversely in this state, the traveling direction of the paper is reversed so as to travel in the direction of the arrow G in a conveyance path 175 for double-sided printing. The reference numeral 177 designates an electrical component box, and a pickup roller 179 is provided in the exit of the sheet feeding tray 178. The number of sheets of paper fed for printing is counted by a sensor provided in a suitable position in the sheet conveyance path, for example, near the sheet feeding tray 178.

For example, a low-speed brushless motor is used as the drive motor for driving the conveyance rollers in the paper conveyance path. On the other hand, a step motor is used for the intermediate transfer belt 169 so as to attain color registration correction or the like. These motors are controlled by signals from a not-shown controller.

In the illustrated state, a yellow (Y) electrostatic latent image is formed on the photoconductor drum 165. Due to a high voltage applied to the developing roller 162a, a yellow image is formed on the photoconductor drum 165. When both of back-side and front-side yellow images are carried on the intermediate transfer belt 169, the developing rotary 161a rotates at an angle of 90 degrees in the direction of the arrow A.

Rotating a full turn, the intermediate transfer belt 169 returns to the position of the photoconductor drum 165. Next, second-side cyan (C) images are formed on the photoconductor drum 165, and carried on the intermediate transfer belt 169 so as to be superimposed on the yellow images respectively. In the same manner, the 90-degree rotation of the developing rotary 161a and the full-turn rotation of the intermediate transfer belt 169 whenever images have been carried thereon are then repeated.

The intermediate transfer belt 169 rotates four turns so as to carry two color images of the four colors. After that, the rotation position of the intermediate transfer belt 169 is controlled so that the images are transferred to the paper in the position of the secondary transfer roller 171. The paper supplied from the paper feed tray 178 is conveyed in the conveyance path 174, and one of the color images is transferred to one side of the paper in the position of the secondary transfer roller 171. The paper having the color image transferred to its one side is reversed by the ejection roller pair 176 as described previously, and waits ready in the conveyance path. After that, the paper is conveyed to the position of the secondary transfer roller 171 at proper timing, and the other color image is transferred to the other side of the paper. An exhaust fan 181 is provided in a housing 180.

Figure 16:
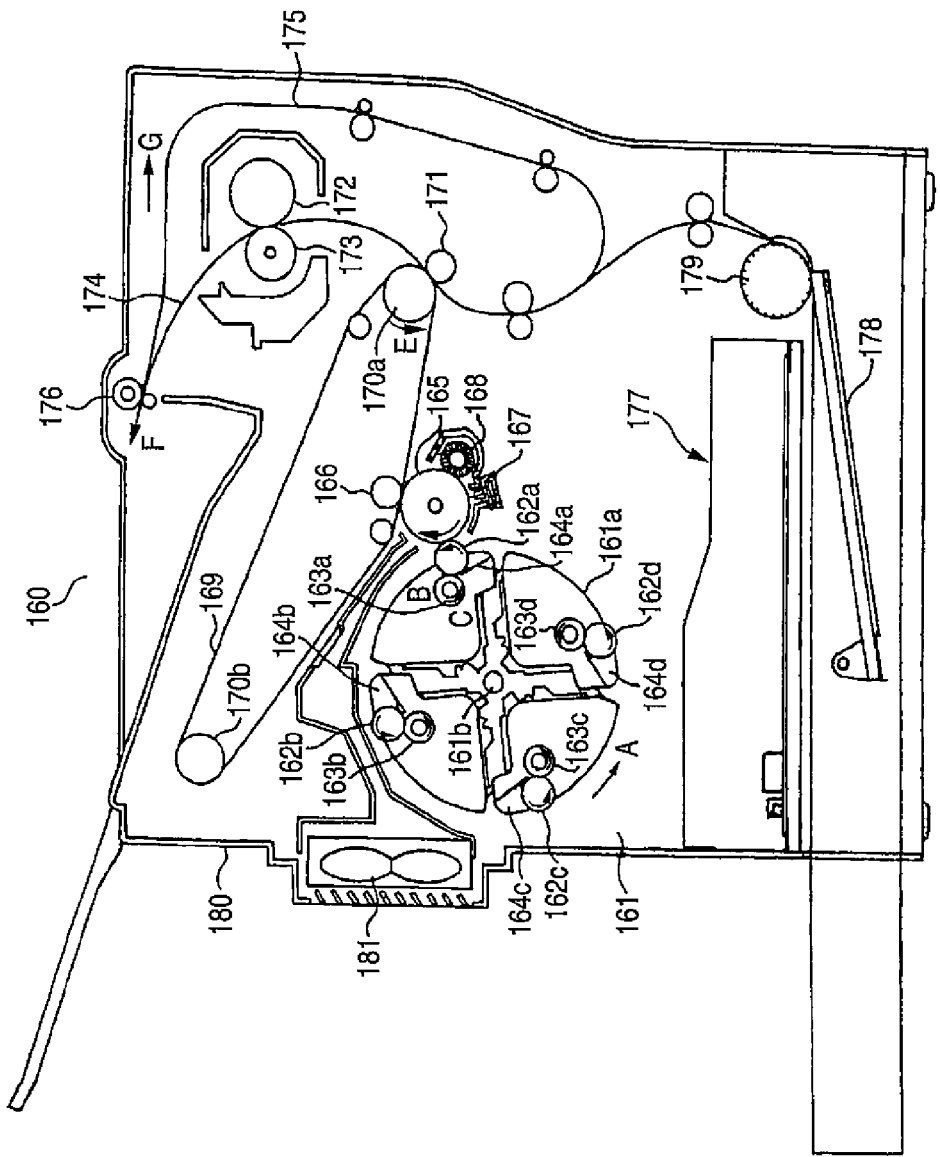
FIG. 16 is a schematic section view of a second example of an image forming apparatus incorporating the line head of the invention.
Figure 17A:
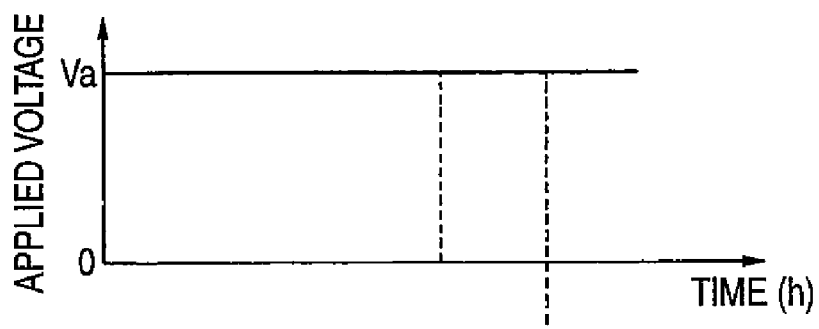
FIG. 17A is a diagram showing the relationship between the operating time period of each light emitting element in a related-art line head and the voltage value applied to the light emitting element.
Figure 17B:
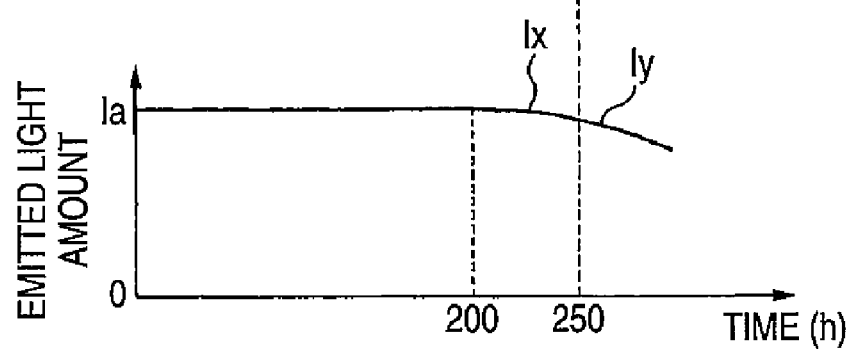
FIG. 17B is a diagram showing the relationship between the operating time period of the light emitting element of FIG. 17A and the emitted light amount therefrom.

According to the invention, in rotary type image forming apparatus as shown in FIG. 16, in which constant voltage/current control is performed on light emitting elements, it is possible to prevent the image quality from deteriorating when the operating time of each light emitting element exceeds a predetermined time period. In addition, in tandem type and rotary type image forming apparatus having an intermediate transfer member, in which constant voltage/current control is performed on light emitting elements, it is possible to prevent the image quality from deteriorating when the operating time of each light emitting element exceeds a predetermined time period.

Description has been made about the line head and the image forming apparatus according to the invention based on their embodiments. The line head and the image forming apparatus according to the invention are not limited to the embodiments, but various modifications can be made thereon.

What is claimed is:

1. A line head, comprising:
   one light emission array including a plurality of light emitting elements arrayed in a first direction, each of which is an organic electroluminescence element;
   a counter, which counts an amount indicative of a used state of at least one of the light emitting elements; and
   a controller, which performs a constant current control with respect to the one of the light emitting elements in accordance with the amount counted by the counter,
   wherein an amount of light emission of the one of the light emitting elements is a first constant value by performing the constant current control in a first current,
   wherein, when the amount counted by the counter reaches a predetermined value, the controller increases a current applied to the one of the light emitting elements from the first current to a second current so that the amount of light emission is a second value substantially equal to the first value.

2. The line head as set forth in claim 1, wherein the counter counts a cumulative operating time period of the one of the light emitting elements.

3. The line head as set forth in claim 1, wherein the counter counts the number of a recording medium on which an image formed by the line head is recorded.

4. The line head as set forth in claim 1, wherein the counter counts the number of formation of a dot array having a predetermined pattern.

5. The line head as set forth in claim 1, wherein the constant current control is performed with respect to each of the light emitting elements.

6. The line head as set forth in claim 1, wherein the light emitting elements are divided into a plurality of groups, and the constant current control is performed with respect to each of the groups.

7. The line head as set forth in claim 1, wherein the constant current control is simultaneously performed with respect to the respective light emitting elements by applying same current.

8. The line head as set forth in claim 1, wherein each of the light emitting elements is driven by a field effect transistor, and a condenser is connected between a gate electrode and a drain electrode of the field effect transistor.

9. The line head as set forth in claim 1, wherein the constant current control is performed by increasing a drive current for the one of the light emitting elements, every time when the result of the comparison indicates that an emitted light amount of the one of the light emitting elements becomes lower than a threshold value.

10. The line head as set forth in claim 1, wherein a plurality of light emission arrays are arranged in a second direction which is perpendicular to the first direction.

11. An image forming apparatus, comprising:
    an image carrier, having a photoconductive surface;
    the line head as set forth in claim 1, which emits light to form an electrostatic latent image on the photoconductive surface; and
    a developing device, which supplies developer onto the photoconductive surface to make the electrostatic latent image visible.

12. A method for controlling current applied to an organic electroluminescence element which is provided in a line head, the method comprising:
    counting an amount indicative of a used state of the organic electroluminescence element;
    performing a constant current control in a first current with respect to the organic electroluminescence element so that an amount of light emission of the organic electroluminescence element is a first value; and
    when the counted amount is reached to a predetermined value, increasing a current applied to the organic electroluminescence element from the first current to a second current so that the amount of light emission is a second value substantially equal to the first value.

* * * * *